US012756990B2

(12) United States Patent
Wang et al.

(10) Patent No.: US 12,756,990 B2
(45) Date of Patent: Oct. 6, 2026

(54) TRANSMISSION METHOD AND DEVICE, AND STORAGE MEDIUM

(71) Applicant: ZTE Corporation, Shenzhen (CN)

(72) Inventors: Liping Wang, Shenzhen (CN); Lin Chen, Shenzhen (CN); Tao Qi, Shenzhen (CN); Hao Zhu, Shenzhen (CN); Kun Cao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 840 days.

(21) Appl. No.: 17/920,827

(22) PCT Filed: Mar. 5, 2021

(86) PCT No.: PCT/CN2021/079212

§ 371 (c)(1),
(2) Date: Oct. 24, 2022

(87) PCT Pub. No.: WO2021/213018

PCT Pub. Date: Oct. 28, 2021

(65) Prior Publication Data

US 2023/0262422 A1 Aug. 17, 2023

(30) Foreign Application Priority Data

Apr. 24, 2020 (CN) ........................ 202010333915.X

(51) Int. Cl.
*H04W 4/06* (2009.01)
*H04W 72/0457* (2023.01)
(Continued)

(52) U.S. Cl.
CPC ............. *H04W 4/06* (2013.01); *H04W 88/12* (2013.01); *H04W 72/0457* (2023.01);
(Continued)

(58) Field of Classification Search
CPC ... H04W 4/06; H04W 48/12; H04W 72/0457; H04W 72/30; H04W 76/40; H04W 88/085
See application file for complete search history.

(56) References Cited

U.S. PATENT DOCUMENTS 7,583,629 B2 * 9/2009 Lee ...................... H04B 7/2603 370/312
8,433,346 B2 * 4/2013 Fischer ............... H04W 72/121 370/312
(Continued)

FOREIGN PATENT DOCUMENTS

CN 109151737 A 1/2019
CN 110475210 A 11/2019
(Continued)

OTHER PUBLICATIONS

European Search Report for corresponding application EP21792879; Report dated Apr. 16, 2024.
(Continued)

*Primary Examiner* — Thomas R Cairns
*Assistant Examiner* — Kai Chang
(74) *Attorney, Agent, or Firm* — CANTOR COLBURN LLP

(57) ABSTRACT

Provided are a transmission method and device, and a storage medium. The transmission method includes the following. Configuration information of a broadcast service or multicast service is received from a second communication node; and broadcast service or multicast service data is received according to the configuration information of the broadcast service or multicast service.

15 Claims, 11 Drawing Sheets

(51) Int. Cl.

| | |
|---|---|
| ***H04W 72/30*** | (2023.01) |
| ***H04W 76/40*** | (2018.01) |
| ***H04W 88/08*** | (2009.01) |
| ***H04W 88/12*** | (2009.01) |

(52) U.S. Cl.

CPC ............ *H04W 72/30* (2023.01); *H04W 76/40* (2018.02); *H04W 88/085* (2013.01)

(56) References Cited

U.S. PATENT DOCUMENTS

| | | | | |
|---|---|---|---|---|
| 2006/0068793 | A1* | 3/2006 | Van Lieshout | H04W 72/30 455/444 |
| 2011/0205952 | A1* | 8/2011 | Gou | H04W 4/06 370/312 |
| 2011/0268050 | A1* | 11/2011 | Farajidana | H04L 25/0226 370/329 |
| 2013/0294316 | A1 | 11/2013 | Amerga et al. | |
| 2018/0049265 | A1* | 2/2018 | Liu | H04W 88/085 |
| 2018/0160398 | A1 | 6/2018 | Park et al. | |
| 2018/0270895 | A1* | 9/2018 | Park | H04W 76/38 |
| 2018/0279375 | A1* | 9/2018 | Jeon | H04W 74/0833 |
| 2019/0090103 | A1 | 3/2019 | Panchal et al. | |
| 2019/0098604 | A1 | 3/2019 | Park | |
| 2020/0029315 | A1* | 1/2020 | Lin | H04W 52/0216 |
| 2020/0077287 | A1 | 3/2020 | Prasad | |
| 2020/0145967 | A1* | 5/2020 | Park | H04W 72/23 |
| 2020/0351818 | A1* | 11/2020 | Park | H04W 52/0216 |
| 2022/0329984 | A1* | 10/2022 | Wang | H04W 4/06 |
| 2022/0338070 | A1* | 10/2022 | Wang | H04W 36/008357 |
| 2023/0099695 | A1* | 3/2023 | Kang | H04W 4/06 370/312 |
| 2023/0262735 | A1* | 8/2023 | Wu | H04L 1/1819 370/312 |

FOREIGN PATENT DOCUMENTS

| | | | |
|---|---|---|---|
| CN | 111901763 | A | 11/2020 |
| KR | 20100071796 | A | 6/2010 |
| WO | 2021051319 | A1 | 3/2021 |

OTHER PUBLICATIONS

Huawei, China Unicom, Orange, “System Information Support over V1 Interface”, 3GPP TSG-RAN3 Meeting #98, Reno, Nevada USA, Nov. 27-Dec. 1, 2017, R3-174430.

International Search Report for corresponding application PCT/CN2021/079212 filed on Mar. 5, 2021; Mail date Jun. 8, 2021.

Korean Office Action for corresponding application 10-2022-7041102 dated Sep. 28, 2023.

Indian Office Action for corresponding application 202227067466; Report dated Mar. 30, 2023.

Chinese Office Action for corresponding application 202010333915.X, Dated Jul. 30, 2025.

* cited by examiner

TRANSMISSION METHOD AND DEVICE, AND STORAGE MEDIUM

CROSS-REFERENCES TO RELATED APPLICATIONS

This is a National Stage Application, filed under 35 U.S.C. 371, of International Patent Application No. PCT/CN2021/079212, filed on Mar. 5, 2021, which is based on and claims priority to Chinese Patent Application No. 202010333915.X filed with the China National Intellectual Property Administration (CNIPA) on Apr. 24, 2020, the disclosure of which is incorporated herein by reference in its entirety.

TECHNICAL FIELD

The present application relates to the communication field, and in particular, to a transmission method, a device and a storage medium.

BACKGROUND

The demand for broadcast services always exists in cellular networks, and application scenes of the broadcast services have gradually expanded from video broadcast services of the initial terrestrial broadcast television to services in vertical fields such as public safety, Internet of vehicles (IoV) and Internet of things (IoT). The Evolved Multimedia Broadcast/Multicast Service (eMBMS) technology architecture in the fourth generation of mobile communication system (4G) limits the expansion of the cellular broadcast technology in the preceding and even more application scenes.

SUMMARY

The present application provides a transmission method, a device and a storage medium, so that the transmission of a broadcast service or multicast service is achieved.

Embodiments of the present application provide a transmission method. The transmission method is applied to a first communication node and includes the following.

Configuration information of a broadcast service or multicast service is received from a second communication node; and broadcast service data or multicast service data is received according to the configuration information of the broadcast service or multicast service.

The embodiments of the present application further provide a transmission method. The transmission method is applied to a second communication node and includes the following.

Configuration information of a broadcast service or multicast service is sent to a first communication node.

The embodiments of the present application further provide a transmission method. The transmission method is applied to a third communication node and includes the following.

Configuration information of a first broadcast service or multicast service is generated; and a message carrying the configuration information of the first broadcast service or multicast service is sent to a fourth communication node.

The embodiments of the present application further provide a transmission method. The transmission method is applied to a fourth communication node and includes the following.

Configuration information of a first broadcast service or multicast service sent by a third communication node; and configuration information of a second broadcast service or multicast service is generated.

The embodiments of the present application further provide a transmission apparatus. The transmission apparatus is applied to a first communication node and includes a first receiver and a second receiver.

The first receiver is configured to receive configuration information of a broadcast service or multicast service from a second communication node; and the second receiver is configured to receive broadcast service data or multicast service data according to the configuration information of the broadcast service or multicast service.

The embodiments of the present application further provide a transmission apparatus. The transmission apparatus is applied to a second communication node and includes a sender.

The sender is configured to send configuration information of a broadcast service or multicast service to a first communication node.

The embodiments of the present application further provide a transmission apparatus. The transmission apparatus is applied to a third communication node and includes a generation module and a sender.

The generation module is configured to generate configuration information of a first broadcast service or multicast service; and the sender is configured to send a message carrying the configuration information of the first broadcast service or multicast service to a fourth communication node.

The embodiments of the present application further provide a transmission apparatus. The transmission apparatus is applied to a fourth communication node and includes a receiver and a generation module.

The receiver is configured to receive configuration information of a first broadcast service or multicast service sent by a third communication node; and the generation module is configured to generate configuration information of a second broadcast service or multicast service.

The embodiments of the present application further provide a device. The device includes a communication module, a memory and one or more processors. The communication module is configured to perform communication interaction between a first communication node, a second communication node, a third communication node and a fourth communication node; the memory is configured to store one or more programs; and the one or more programs, when executed by the one or more processors, cause the one or more processors to implement the transmission method according to any one of the preceding embodiments The embodiments of the present application further provide a storage medium. The storage medium stores a computer program which, when executed by a processor, implements the transmission method according to any one of the preceding embodiments.

DETAILED DESCRIPTION

Figure 1:
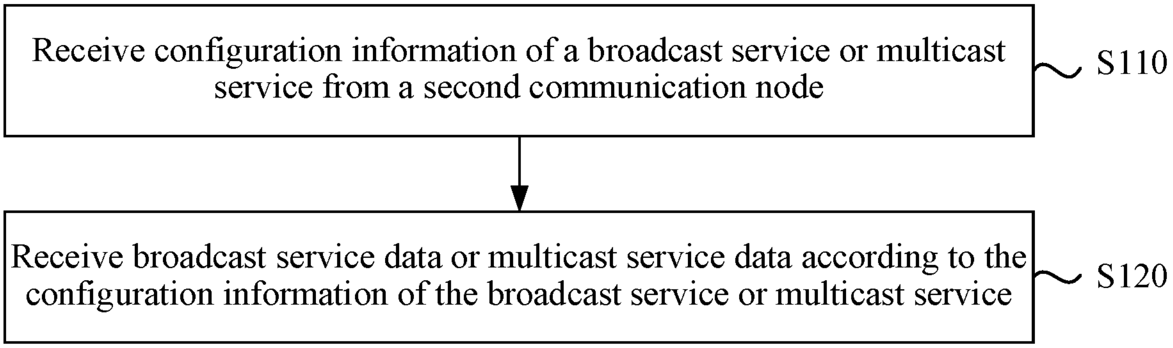
FIG. 1 is a flowchart of a transmission method according to an embodiment of the present application.

Embodiments of the present application are described below in conjunction with drawings.

The Evolved Multimedia Broadcast/Multicast Service (eMBMS) technology in the Long-Term Evolution (LTE) has evolved over the last decade from Release 9 (R9) of the 3rd Generation Partnership Project (3GPP) to the latest Release 16 (R16) of 3GPP. The broadcast network architecture of the conventional eMBMS is designed for semi-persistent video service distribution. For example, the distribution of the LTE eMBMS at the air interface does not depend on feedbacks of a user, or only optional and limited feedbacks exist, so that the network knows the reception interest and the reception quality of the user to a limited extent. The network cannot flexibly implement the scheduling of services; for example, the broadcast domain cannot be dynamically adjusted, and the occupation of resources by the broadcast cannot be dynamically adjusted. All the preceding factors cause the waste of air interface resources to a certain extent, thus hindering the use and promotion of the technology.

The single cell point-to-multipoint (SC-PTM) technology introduced in Release 13 (R13) is introduced to improve the flexibility of air interface scheduling. However, the SC-PTM technology essentially depends on the network architecture foundation set by R9. Essentially, the SC-PTM technology is obtained based on a new air interface data bearing mode added to the original architecture. The bearing mode is achieved based on independent scheduling of a single cell and flexible use of air interface resources, for example, not using a physical multicast channel (PMCH) used by a Multicast Broadcast Single Frequency Network (MBSFN) in the conventional eMBMS, but using a physical downlink shared channel (PDSCH) consistent with unicast data, so as to achieve dynamic and flexible scheduling. Although the SC-PTM technology improves the flexibility of the air interface, the problem at the architecture level is not solved. That is, due to the characteristic of semi-persistent configuration of the broadcast domain, the dynamic adjustment of the broadcast domain depends on the driving at the service level and cannot be linked with the flexible and powerful UE air interface connection management in 3GPP. As a result, the efficient use of resources cannot be achieved, and the reliability and continuity of service cannot be ensured to a certain extent.

In the 5G system, a new broadcast architecture for 5G is defined. The new broadcast architecture supports multicast and takes new service types such as public security, cellular Internet of things (CIoT) and Vehicle-to-Everything (V2X) radio communication technologies. In the first version of 5G supporting multicast broadcast, the preceding diverse scenes are supported by the New Radio Access Technology Multicast Broadcast service (NR MBS), so that a flexible multicast broadcast architecture is provided, which can adapt to requirements of different scenes, such as Ad-hoc multicast/broadcast streaming, transparent Internet Protocol version 4 (IPv4)/Internet Protocol version 6 (IPv6) multicast transmission, Internet Protocol television (IPTV), radio software transmission, group communication and broadcast/multicast physical network applications, V2X applications and public security. The flexible multicast broadcast architecture provides a certain degree of reliability, and also supports energy-saving and resource-limited receiving devices. Moreover, a UE may also be enabled to switch between the receiving mode of point-to-point sending and the receiving mode of point-to-multipoint sending, so that a balance between reliability and reception efficiency is achieved. NR also supports basic UE mobility to ensure that the UE achieves consecutive service reception in handover/reselection scenes. In addition, NR also supports uplink feedbacks of the UE, thereby improving the reception reliability of the UE. In view of this, for introducing a support scheme of a broadcast/multicast service in NR, how to configure a system message of configuration information of the broadcast service or multicast service to perform transmission of the broadcast service or multicast service is an urgent problem to be solved.

FIG. 1 is a flowchart of a transmission method according to an embodiment of the present application. The embodiment is executed by a first communication node. Exemplarily, the first communication node may be a user equipment (UE). As shown in FIG. 1, the embodiment includes S110 to S120.

In S110, configuration information of a broadcast service or multicast service is received from a second communication node.

In the embodiment, the configuration information of the broadcast service or multicast service refers to related configuration information of a broadcast service or a multicast service. The second communication node refers to a network side of a radio access network (RAN). Exemplarily, the second communication node may be a base station or a distributed unit (DU) of the base station.

In S120, broadcast service data or multicast service data is received according to the configuration information of the broadcast service or multicast service.

In the embodiment, after configuring the configuration information of the broadcast service or multicast service, the second communication node sends the configuration information of the broadcast service or multicast service to the first communication node so that the first communication node receives the broadcast service data or multicast service data according to the configuration information of the broadcast service or multicast service.

In an embodiment, the second communication node includes one of: a base station or a distributed unit of the base station. In the embodiment, in a case where the second communication node is a distributed unit of a base station, the second communication node may carry the configuration information of the broadcast service or multicast service in a system information block (SIB) and sends the configuration information of the broadcast service or multicast service to the first communication node, so as to notify the first communication node of the configuration information of the broadcast service or multicast service on a current carrier and an adjacent carrier, and enable the first communication node to report the broadcast service or multicast service of interest to a current serving cell according to the configuration information of the broadcast service or multicast service.

In an embodiment, the configuration information of the broadcast service or multicast service includes at least one of: system information of the broadcast service or multicast service, configuration information of a broadcast service or multicast service control channel, configuration information of a broadcast service or multicast service transmission channel or bearer configuration information of the broadcast service or multicast service.

In an embodiment, the system information of the broadcast service or multicast service includes at least one of: a service area list supported on a current frequency, a service area list supported on an adjacent frequency, a downlink frequency of an adjacent carrier or identification information of the broadcast service or multicast service. In the embodiment, information of the service area list supported on the current frequency or information of the service area list supported on the adjacent frequency may be determined through a Service Area Identifier (SAI), that is, the SAI is used for determining an area of one or more cells which can be covered by a broadcast service or multicast service. Such an area is referred to as a service area and may be used by a core network for indicating an area covered by the broadcast service or multicast service. In the embodiment, the service area list supported on the current frequency refers to a service area determined according to a SAI list supported on the current frequency; a service area list supported on the adjacent frequency refers to a service area determined according to the SAI list supported on the adjacent frequency of a current frequency; the downlink frequency of the adjacent carrier refers to each downlink frequency of the carrier adjacent to a current frequency.

In an embodiment, in a case where the configuration information of the broadcast service or multicast service includes the system information of the broadcast service or multicast service, receiving the configuration information of the broadcast service or multicast service from the second communication node includes the following. The system information of the broadcast service or multicast service is received through a system message or a dedicated radio resource control (RRC) message.

In an embodiment, the configuration information of the broadcast service or multicast service control channel includes at least one of: identification information of the broadcast service or multicast service, a repetition period of the broadcast service or multicast service control channel, an offset of the broadcast service or multicast service control channel, a start slot of the broadcast service or multicast service control channel, a duration of the broadcast service or multicast service control channel, a modification period of the broadcast service or multicast service control channel or a bandwidth part (BWP) identifier of the broadcast/multicast service control channel.

In an embodiment, in a case where the configuration information of the broadcast service or multicast service includes the configuration information of the broadcast service or multicast service control channel, receiving the configuration information of the broadcast service or multicast service from the second communication node includes the following. The configuration information of the broadcast service or multicast service control channel is received through a system message or a dedicated RRC message.

In an embodiment, the configuration information of the broadcast service or multicast service transmission channel includes at least one of: identification information of the broadcast service or multicast service, radio air interface identification information of the broadcast service or multicast service, Service Area Identifier information of the broadcast service or multicast service, a neighbor list or scheduling configuration information of the broadcast service or multicast service transmission channel.

In an embodiment, the scheduling configuration information of the broadcast service or multicast service transmission channel includes: a persistent timer of the broadcast service or multicast service transmission channel, a timer related to discontinuous reception (DRX) of the broadcast service or multicast service transmission channel, a scheduling period of the broadcast service or multicast service transmission channel, a scheduling offset of the broadcast service or multicast service transmission channel or a bandwidth part identifier of the broadcast service or multicast service transmission channel.

In an embodiment, in a case where the configuration information of the broadcast service or multicast service includes the configuration information of the broadcast service or multicast service transmission channel, receiving the configuration information of the broadcast service or information of the broadcast service or multicast service transmission channel is received through a system message, an RRC message transmitted on the broadcast service or multicast service control channel or a dedicated RRC message.

In an embodiment, the bearer configuration information of the broadcast service or multicast service includes at least one of: identification information of the broadcast service or multicast service, radio air interface identification information of the broadcast service or multicast service, Service Area Identifier information of the broadcast service or multicast service, a neighbor list, configuration information of an air interface radio bearer of the broadcast service or multicast service or an air interface transmission mode indication of the broadcast service or multicast service, where the air interface transmission mode indication of the broadcast service or multicast service includes: a unicast transmission indication or a multicast transmission indication.

In an embodiment, the configuration information of the air interface radio bearer of the broadcast service or multicast service includes at least one of: identification information of the air interface radio bearer of the broadcast service or multicast service, a sequence number length of a Packet Data Convergence Protocol (PDCP) layer, a maximum context identifier, a reordering timer, a sequence number length of a radio link control (RLC) layer or a reassembly timer.

In an embodiment, in a case where the configuration information of the broadcast service or multicast service includes the bearer configuration information of the broadcast service or multicast service, receiving the configuration information of the broadcast service or multicast service from the second communication node includes the following. The bearer configuration information of the broadcast service or multicast service is received through a system message, an RRC message transmitted on the broadcast service or multicast service control channel or a dedicated RRC message.

Figure 2:
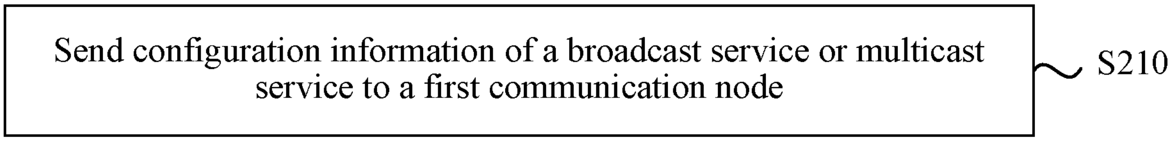
FIG. 2 is a flowchart of another transmission method according to an embodiment of the present application.

FIG. 2 is a flowchart of another transmission method according to an embodiment of the present application. The embodiment is applied to a second communication node. As shown in FIG. 2, the embodiment includes S210.

In S210, configuration information of a broadcast service or multicast service is sent to a first communication node.

In the embodiment, the second communication node performs information configuration on the broadcast service or multicast service, generates the configuration information of the broadcast service or multicast service, and sends the configuration information of the broadcast service or multicast service to the first communication node, so that the first communication node receives broadcast service data or multicast service data according to the configuration information of the broadcast service or multicast service.

In an embodiment, the second communication node includes one of: a base station or a distributed unit of a base station.

In an embodiment, the configuration information of the broadcast service or multicast service includes at least one of: system information of the broadcast service or multicast service, configuration information of a broadcast service or multicast service control channel, configuration information of a broadcast service or multicast service transmission channel or bearer configuration information of the broadcast service or multicast service.

In an embodiment, the system information of the broadcast service or multicast service includes at least one of: a service area list supported on a current frequency, a service area list supported on an adjacent frequency, a downlink frequency of an adjacent carrier or identification information of the broadcast service or multicast service.

In an embodiment, in a case where the configuration information of the broadcast service or multicast service includes the system information of the broadcast service or multicast service, sending the configuration information of the broadcast service or multicast service to the first communication node includes the following. The system information of the broadcast service or multicast service is sent to the first communication node through a system message or a dedicated RRC message.

In an embodiment, the configuration information of the broadcast service or multicast service control channel includes at least one of: identification information of the broadcast service or multicast service, a repetition period of the broadcast service or multicast service control channel, an offset of the broadcast service or multicast service control channel, a start slot of the broadcast service or multicast service control channel, a duration of the broadcast service or multicast service control channel, a modification period of the broadcast service or multicast service control channel or a bandwidth part identifier of the broadcast/multicast service control channel.

In an embodiment, in a case where the configuration information of the broadcast service or multicast service includes the configuration information of the broadcast service or multicast service control channel, sending the configuration information of the broadcast service or multicast service to the first communication node includes the following. The configuration information of the broadcast service or multicast service control channel is sent to the first communication node through a system message or a dedicated RRC message.

In an embodiment, the configuration information of the broadcast service or multicast service transmission channel includes at least one of: identification information of the broadcast service or multicast service, radio air interface identification information of the broadcast service or multicast service, Service Area Identifier information of the broadcast service or multicast service, a neighbor list or scheduling configuration information of the broadcast service or multicast service transmission channel.

In an embodiment, the scheduling configuration information of the broadcast service or multicast service transmission channel includes: a persistent timer of the broadcast service or multicast service transmission channel, a timer related to DRX of the broadcast service or multicast service transmission channel, a scheduling period of the broadcast service or multicast service transmission channel, a scheduling offset of the broadcast service or multicast service transmission channel or a bandwidth part identifier of the broadcast service or multicast service transmission channel.

In an embodiment, in a case where the configuration information of the broadcast service or multicast service includes the configuration information of the broadcast service or multicast service transmission channel, sending the configuration information of the broadcast service or multicast service to the first communication node includes the following. The configuration information of the broadcast service or multicast service transmission channel is sent to the first communication node through a system message, an RRC message transmitted on the broadcast service or multicast service control channel or a dedicated RRC message.

In an embodiment, the bearer configuration information of the broadcast service or multicast service includes at least one of: identification information of the broadcast service or multicast service, radio air interface identification information of the broadcast service or multicast service, Service Area Identifier information of the broadcast service or multicast service, a neighbor list, configuration information of an air interface radio bearer of the broadcast service or multicast service or an air interface transmission mode indication of the broadcast service or multicast service, where the air interface transmission mode indication of the broadcast service or multicast service includes: a unicast transmission indication or a multicast transmission indication.

In an embodiment, the configuration information of the air interface radio bearer of the broadcast service or multicast service includes at least one of: identification information of the air interface radio bearer of the broadcast service or multicast service, a sequence number length of a PDCP layer, a maximum context identifier, a reordering timer, a sequence number length of an RLC layer or a reassembly timer.

In an embodiment, in a case where the configuration information of the broadcast service or multicast service includes the bearer configuration information of the broadcast service or multicast service, sending the configuration information of the broadcast service or multicast service to the first communication node includes the following. The bearer configuration information of the broadcast service or multicast service is sent to the first communication node through a system message, an RRC message transmitted on the broadcast service or multicast service control channel or a dedicated RRC message.

Figure 3:
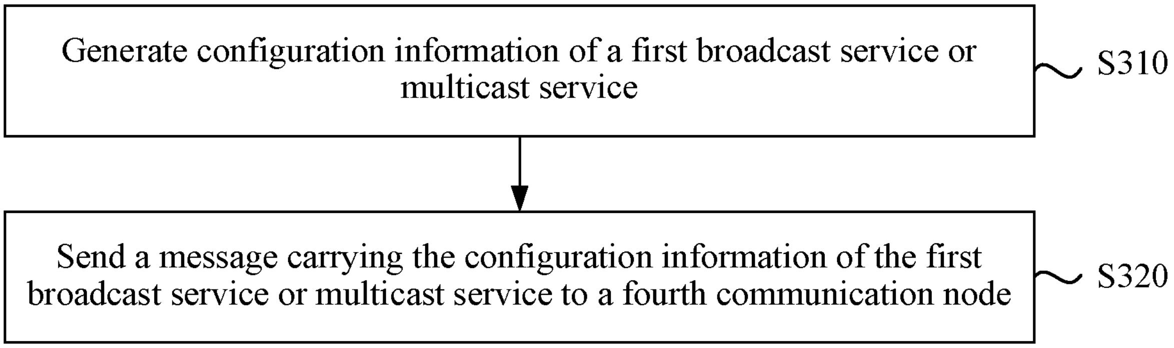
FIG. 3 is a flowchart of another transmission method according to an embodiment of the present application.

In an example, FIG. 3 is a flowchart of another transmission method according to an embodiment of the present application. The embodiment is applied to a third communication node. Exemplarily, the third communication node is a distributed unit (DU). As shown in FIG. 3, the embodiment includes S310 to S320.

In S310, configuration information of a first broadcast service or multicast service is generated.

In S320, a message carrying the configuration information of the first broadcast service or multicast service is sent to a fourth communication node.

In an embodiment, the configuration information of the first broadcast service or multicast service includes at least one of: configuration information of a broadcast service or multicast service control channel, scheduling configuration information of a broadcast service or multicast service transmission channel or bearer configuration information of RLC of a broadcast service or multicast service.

In an embodiment, the configuration information of the broadcast service or multicast service control channel includes at least one of: identification information of the broadcast service or multicast service, a repetition period of the broadcast service or multicast service control channel, an offset of the broadcast service or multicast service control channel, a start slot of the broadcast service or multicast service control channel, a duration of the broadcast service or multicast service control channel, a modification period of the broadcast service or multicast service control channel or a bandwidth part identifier of the broadcast service or multicast service control channel.

In an embodiment, in a case where the configuration information of the first broadcast service or multicast service includes the configuration information of the broadcast service or multicast service control channel, the method applied to the third communication node further includes the following. The configuration information of the broadcast service or multicast service control channel is assembled and encoded, and a message of the configuration information of the broadcast service or multicast service control channel is generated; and the message of the configuration information of the broadcast service or multicast service control channel is sent to a first communication node.

In the embodiment, the message of the configuration information of the broadcast service or multicast service control channel may be a system message or an RRC message.

In an embodiment, the transmission method applied to the third communication node further includes the following. A message of configuration information of a third broadcast service or multicast service sent by the fourth communication node is received; and the message carrying the configuration information of the third broadcast service or multicast service is sent to a first communication node.

In the embodiment, the message of the configuration information of the third broadcast service or multicast service is a message obtained by assembling and encoding the configuration information of the first broadcast service or multicast service and configuration information of a second broadcast service or multicast service. The message of the configuration information of the third broadcast service or multicast service is a message corresponding to the configuration information of the broadcast service or multicast service involved in the preceding embodiment applied to the first communication node and the preceding embodiment applied to the second communication node. That is, the configuration information of the broadcast service or multicast service during the interaction between the first communication node and the second communication node is the configuration information of the third broadcast service or multicast service involved in the third communication node.

In an embodiment, the scheduling configuration information of the broadcast service or multicast service transmission channel includes at least one of: a persistent timer of the broadcast service or multicast service transmission channel, a timer related to DRX of the broadcast service or multicast service transmission channel, a scheduling period of the broadcast service or multicast service transmission channel, a scheduling offset of the broadcast service or multicast service transmission channel or a bandwidth part identifier of the broadcast service or multicast service control channel.

In an embodiment, the bearer configuration information of the RLC of the broadcast service or multicast service includes at least one of: identification information of an air interface radio bearer of the broadcast service or multicast service, a sequence number length of an RLC layer, a reassembly timer or a logical channel identifier (LCID).

Figure 4:
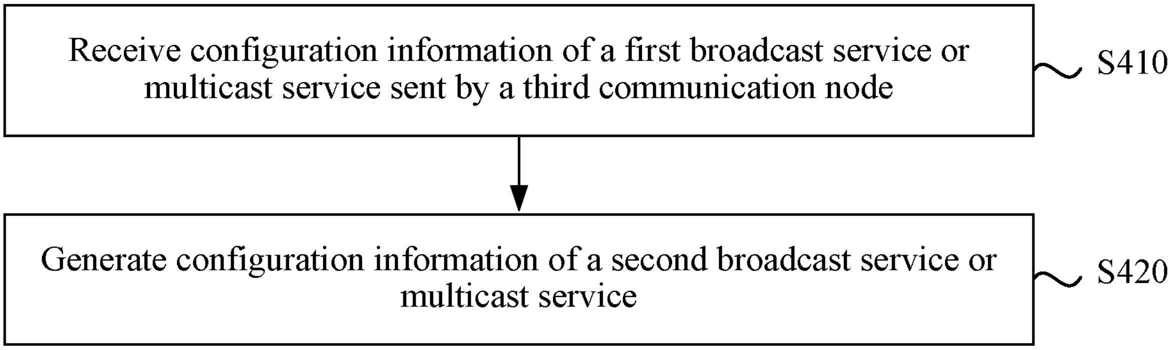
FIG. 4 is a flowchart of another transmission method according to an embodiment of the present application.

In an example, FIG. 4 is a flowchart of another transmission method according to an embodiment of the present application. The embodiment is applied to a fourth communication node. Exemplarily, the fourth communication node may be a central unit (CU). As shown in FIG. 4, the embodiment includes S410 to S420.

In S410, configuration information of a first broadcast service or multicast service sent by a third communication node is received.

In S420, configuration information of a second broadcast service or multicast service is generated.

In an embodiment, the configuration information of the second broadcast service or multicast service includes at least one of: system information of a broadcast service or multicast service, configuration information of a broadcast service or multicast service transmission channel, bearer configuration information of a broadcast service or multicast service or a change notification of configuration information of a broadcast service or multicast service.

In an embodiment, the transmission method applied to the fourth communication node further includes the following. The configuration information of the first broadcast service or multicast service and the configuration information of the second broadcast service or multicast service are assembled and encoded, and a message of configuration information of a third broadcast service or multicast service is generated; and the message of the configuration information of the third broadcast service or multicast service is sent to the third communication node. In the embodiment, the explanation of the message of the configuration information of the third broadcast service or multicast service is as described above in the embodiment applied to the third communication node and is not repeated here.

In the embodiment, the message of the configuration information of the broadcast service or multicast service may be a system message or an RRC message.

Figure 5:
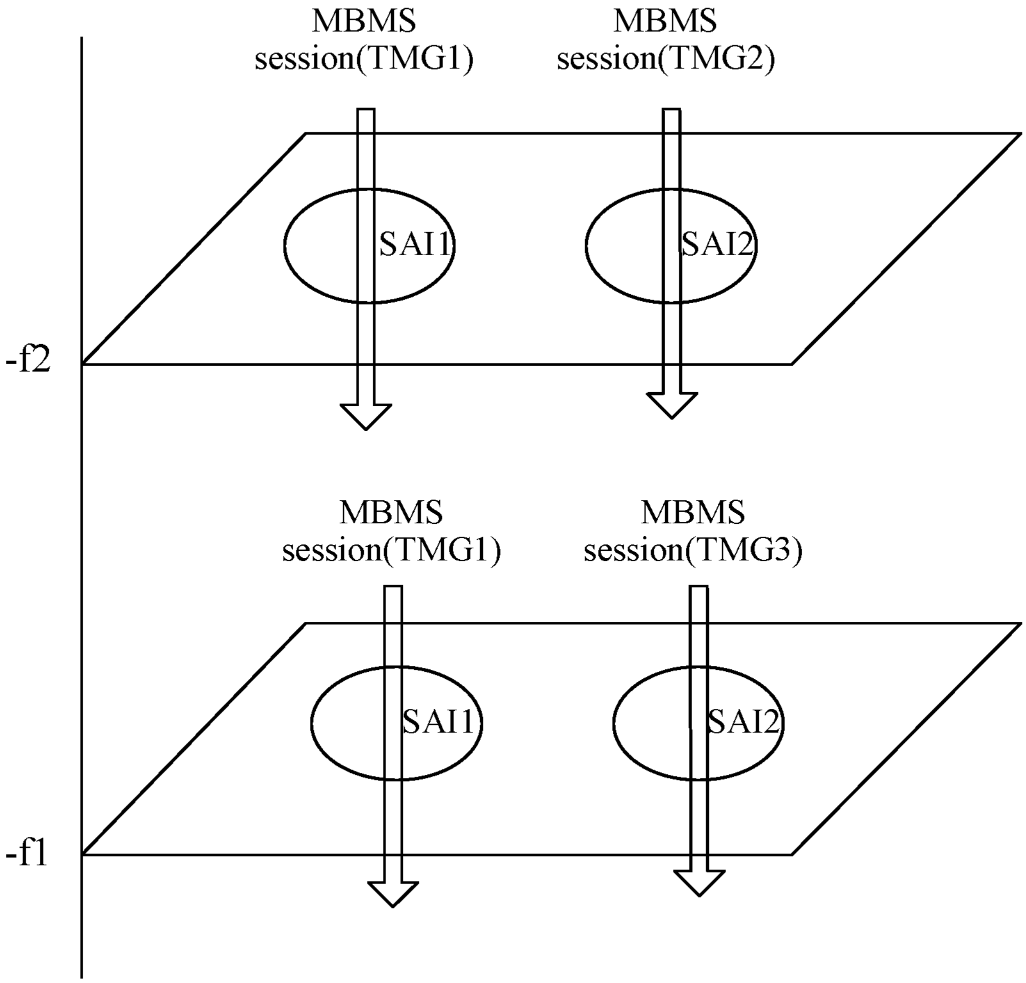
FIG. 5 is a diagram showing corresponding relationship of information contained in a message of system information of a broadcast service or multicast service according to an embodiment of the present application.

In an implementation, an example is used where the first communication node is a UE, the second communication node is a network side of a radio access network, configuration information of a broadcast service or multicast service is carried by a system message for transmission, and the configuration information of the broadcast service or multicast service is system information of the broadcast service or multicast service so that a transmission process (that is, a sending and receiving process) of the configuration information of the broadcast service or multicast service is illustrated. In the 5G NR system, the network side of the radio access network provides a service of a broadcast service or multicast service for a UE. The network side sends a message providing the system information of the broadcast service or multicast service to the UE, and the UE may determine whether to performing reporting of interest (that is, the target service) by using the message of the system information of the broadcast service or multicast service. The system information of the broadcast service or multicast service includes any combination or at least one of: a service area list supported on a current frequency, a service area list supported on an adjacent frequency, a downlink frequency of an adjacent carrier or identification information of the broadcast service or multicast service. The identification information of the broadcast service or multicast service is used for uniquely specifying an identifier of the broadcast service or multicast service. Exemplarily, FIG. 5 is a diagram showing corresponding relationship of information contained in a message of system information of a broadcast service or multicast service according to an embodiment of the present application. As shown in FIG. 5, a corresponding relationship between frequencies related to the broadcast service, SAIs and Temporary Mobile Group Identity (TMGI) information which are indicated in the message of the system information of the broadcast service or multicast service is used as an example to illustrate the relationship of the contained information. f1 and f2 represent a current frequency and an adjacent frequency respectively; SAI1 and SAI2 represent that the identifiers of SAIs are 1 and 2 respectively. The UE reports the service of interest to the UE based on information acquired from the message of the system information of the broadcast service or multicast service. In the embodiment, the UE acquires a frequency of the service of interest, a SAI and identification information of the broadcast service or multicast service from the message of the system information of the broadcast service or multicast service, and then the UE reports the frequency of interest to the UE and/or the identification information of the broadcast service or multicast service of interest to the UE to a current serving cell through an RRC message.

Figure 6:
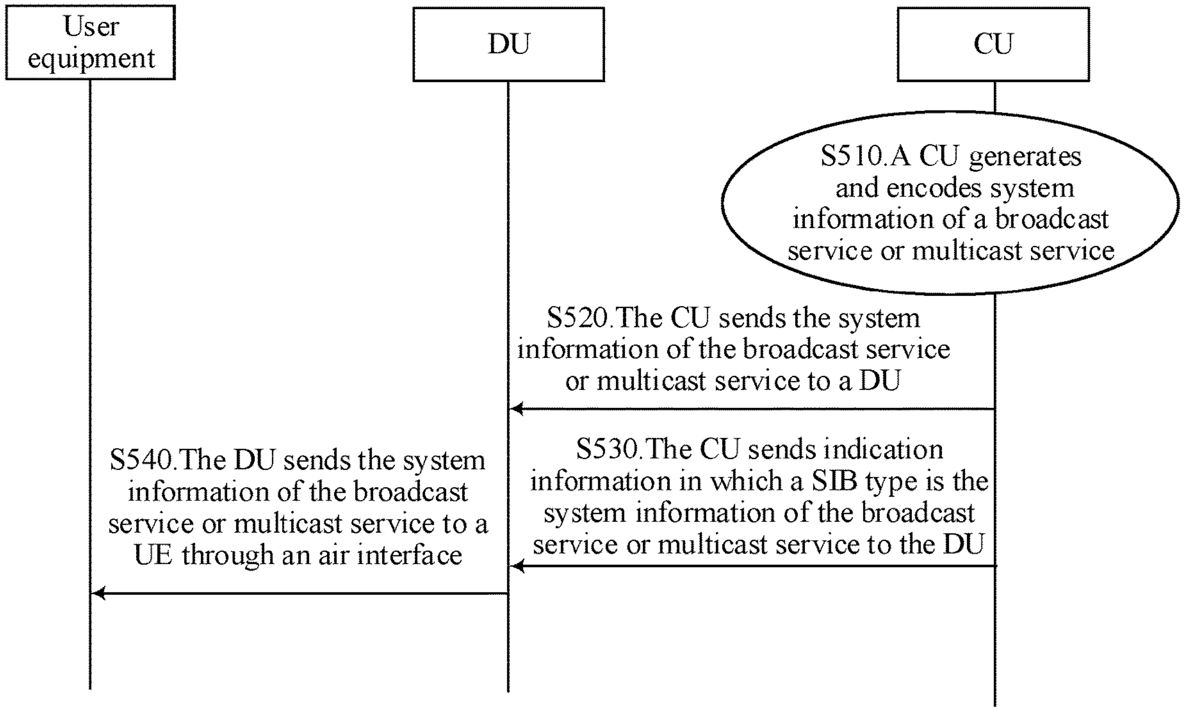
FIG. 6 is a diagram illustrating a transmission of a message of system information of a broadcast service or multicast service according to an embodiment of the present application.

It can be seen from the information included in the message of the system information of the broadcast service or multicast service in FIG. 5 that the message of the system information of the broadcast service or multicast service may include MBMS SAI information on a current carrier and MBMS SAI information on an adjacent carrier. The MBMS SAI information comes from a CU side (a base station includes two parts, that is, a CU and a distributed unit (DU), in the 5G system) of the network. That is, information contained in a message of system information of a NR-MBMS may be generated and encoded by the CU. FIG. 6 is a diagram illustrating a transmission of a message of system information of a broadcast service or multicast service according to an embodiment of the present application. As shown in FIG. 6, the embodiment includes S510 to S540.

In S510, a CU generates and encodes system information of a broadcast service or multicast service.

In S520, the CU sends the system information of the broadcast service or multicast service to a DU.

In S530, the CU sends indication information in which a SIB type is the system information of the broadcast service or multicast service to the DU.

In S540, the DU sends the system information of the broadcast service or multicast service to a UE through an air interface.

In the embodiment, the CU side generates the system information of the broadcast service or multicast service, and then assembles and encodes the system information of the broadcast service or multicast service. The CU sends the assembled and encoded system information of the broadcast service or multicast service to the DU through an F1 message, where the F1 message may include: a setup response message, a next generation NodeB (gNB)-CU configuration update message, a gNB-CU configuration update confirmation message or other F1 messages. Meanwhile, the SIB type that the CU needs to indicate is the system information of the broadcast service or multicast service. Then, the DU sends the system information of the broadcast service or multicast service to the UE through air interface broadcast.

In an embodiment, on-demand sending of the message of the system information of the broadcast service or multicast service at the air interface is also supported, that is, the CU side sends the system information of the broadcast service or multicast service based on an application request of the UE. In the embodiment, the transmission of the system information of the broadcast service or multicast service is also different when the UE is in different states.

For an idle UE or an inactive UE, the UE applies for the system information of the broadcast service or multicast service from the DU through randomly accessed message 1 (msg1) or randomly accessed message 3 (msg3) at an air interface. After receiving the application, the DU notifies the CU of a UE list carrying requirements of the system information of the broadcast service or multicast service through an F1 message (such as a gNB-DU configuration update message, a gNB-CU configuration update confirmation message or other F1 messages). The CU then indicates an air interface of the DU sending the system information of the broadcast service or multicast service through an F1 message.

For a connected UE, the UE sends a dedicated RRC message to request the system information of the broadcast service or multicast service from the CU, and then the CU indicates the DU sending the message of the system information of the broadcast service or multicast service. In addition, the base station indicates through an RRC message to the UE supporting on-demand sending of the message of the system information of the broadcast service or multicast service.

Moreover, if the base station intends to send the system information of the broadcast service or multicast service, the base station needs to indicate scheduling information of the system information of the broadcast service or multicast service by broadcasting SIB1 during a cell in advance, where the scheduling information includes a broadcast start position of the message of the system information of the broadcast service or multicast service, a sending period of the message of the system information of the broadcast service or multicast service and a sending window length of the message of the system information of the broadcast service or multicast service. The UE may receive the system information of the broadcast service or multicast service sent by the base station on a downlink shared channel (DL-SCH) through a System Information-Radio Network Temporary Identifier (SI-RNTI).

Figure 7:
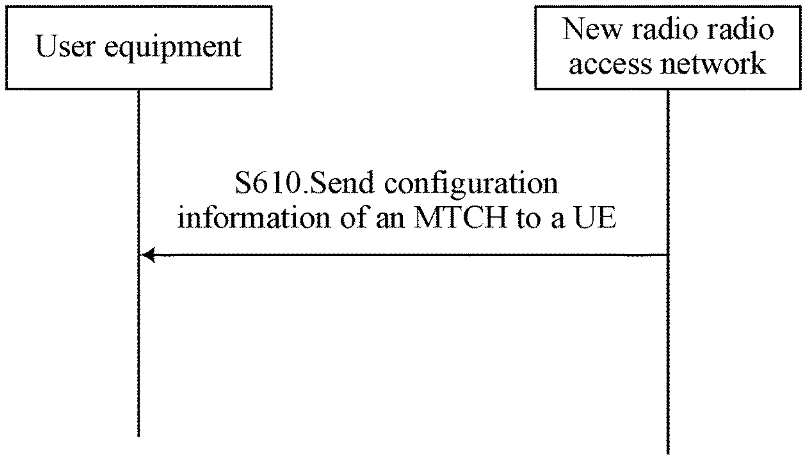
FIG. 7 is a flowchart of a UE reading configuration information of an MTCH on a broadcast service or multicast service control channel according to an embodiment of the present application.

In an implementation, an example is used where the first communication node is a UE, the second communication node is a network side of a radio access network, configuration information of a broadcast service or multicast service is transmitted by a system message, and the configuration information of the broadcast service or multicast service is configuration information of a broadcast service or multicast service control channel so that a transmission process (including a sending and receiving process) of the configuration information of the broadcast service or multicast service is illustrated. In the 5G NR system, the network side of the radio access network provides a service of a broadcast service or multicast service for a UE. The network side sends a system message providing the configuration information of the broadcast service or multicast service to the UE, and the UE may acquire configuration information of a broadcast service or multicast service control channel of a current cell through the system message. The UE can retrieve the broadcast service or multicast service control channel by reading the configuration information of the broadcast service or multicast service control channel. In the embodiment, the UE may receive configuration information (that is, configuration information of a Multicast Traffic Channel (MTC)) of a broadcast service or multicast service transmission channel on the broadcast service or multicast service control channel. FIG. 7 is a flowchart of a UE reading configuration information of an MTCH on a broadcast service or multicast service control channel according to an embodiment of the present application. As shown in FIG. 7, the embodiment includes S610.

In S610, configuration information of an MTCH is sent to a UE.

In the embodiment, the UE may receive broadcast service data or multicast service data on a broadcast service or multicast service transmission channel by parsing the configuration information of the MTCH.

Figure 8:
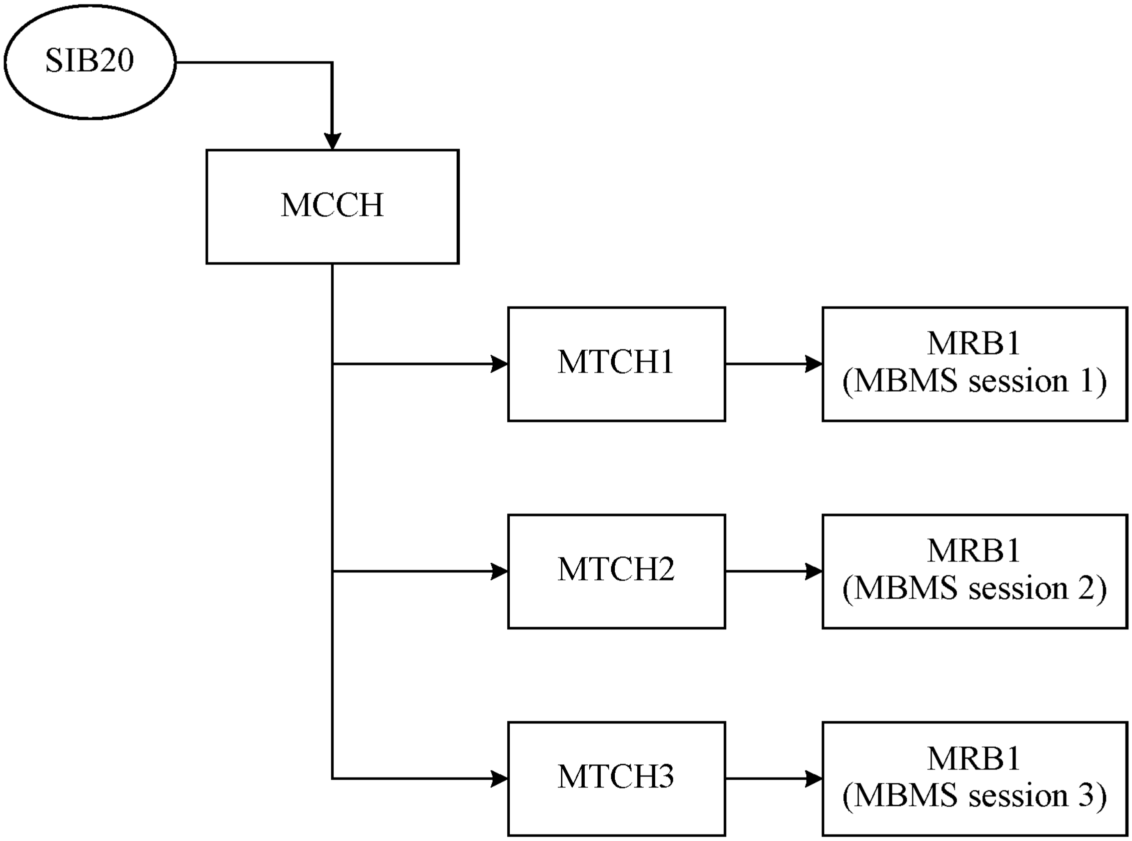
FIG. 8 is a recursion diagram of a UE receiving broadcast service data or multicast service data according to an embodiment of the present application.

FIG. 8 is a recursion diagram of a UE receiving broadcast service data or multicast service data according to an embodiment of the present application. As shown in FIG. 8, a UE reads a system message of configuration information of a broadcast service or multicast service, retrieves a broadcast service or multicast service control channel, receives configuration information of a broadcast service or multicast service transmission channel, and receives broadcast service data or multicast service data on the broadcast service or multicast service transmission channel. In the embodiment, the UE reads the system message of the configuration information of the broadcast service or multicast service, retrieves the broadcast service or multicast service control channel, receives the configuration information of the broadcast service or multicast service transmission channel on the broadcast service or multicast service control channel, and receives the broadcast service data or multicast service data on the broadcast service or multicast service transmission channel.

In the process of the UE receiving the broadcast service data or multicast service data, the configuration information of the broadcast service or multicast service control channel carried in the system message of the configuration information of the broadcast service or multicast service includes any combination or at least one of: identification information of the broadcast service or multicast service, a repetition period of the broadcast service or multicast service control channel, an offset of the broadcast service or multicast service control channel, a start slot of the broadcast service or multicast service control channel, a duration of the broadcast service or multicast service control channel, a modification period of the broadcast service or multicast service control channel or a bandwidth part identifier of the broadcast service or multicast service control channel.

In the process of the UE receiving the broadcast service data or multicast service data, the configuration information of the broadcast service or multicast service transmission channel transmitted on the broadcast service or multicast service control channel includes a list of the configuration information of the broadcast service or multicast service transmission channel.

Configuration information of each broadcast service or multicast service transmission channel includes any combination or at least one of: identification information of the broadcast service or multicast service, radio air interface identification information of the broadcast service or multicast service, Service Area Identifier information of the broadcast service or multicast service, a neighbor list or scheduling configuration information of the each broadcast service or multicast service transmission channel. The scheduling configuration information of the each broadcast service or multicast service transmission channel includes any combination or at least one of following information: a persistent timer of the each broadcast service or multicast service transmission channel, a timer related to DRX of the each broadcast service or multicast service transmission channel, a scheduling period of the each broadcast service or multicast service transmission channel, a scheduling offset of the each broadcast service or multicast service transmission channel or a bandwidth part identifier of the each broadcast service or multicast service transmission channel.

In an embodiment, configuration information of a broadcast service or multicast service channel may further include bearer configuration information of the broadcast service or multicast service, and the bearer configuration information of the broadcast service or multicast service includes any combination or at least one of the following information: identification information of the broadcast service or multicast service, radio air interface identification information of the broadcast service or multicast service, Service Area Identifier information of the broadcast service or multicast service, a neighbor list, configuration information of an air interface radio bearer of the broadcast service or multicast service or an air interface transmission mode indication of the broadcast service or multicast service. The configuration information of the air interface radio bearer of the broadcast service or multicast service includes any combination or at least one of the following information: identification information of the air interface radio bearer of the broadcast service or multicast service, a sequence number length of a PDCP layer, a maximum context identifier, a reordering timer, a sequence number length of an RLC layer or a reassembly timer (e.g. T-Reassembly timer).

In an embodiment, the preceding bearer configuration information of the broadcast service or multicast service may further include the air interface transmission mode indication of the broadcast service or multicast service, and the air interface transmission mode indication of the broadcast service or multicast service may include any combination of: a unicast transmission indication or a multicast transmission indication. The air interface transmission mode indication of the broadcast service or multicast service is used for indicating whether the broadcast service or multicast service is sent by means of unicast or multicast.

It can be seen from information contained in the preceding system message of the configuration information of the broadcast service or multicast service that the system message of the configuration information of the broadcast service or multicast service may include the configuration information of the broadcast service or multicast service control channel, that is, configuration information of a time-frequency resource of a physical layer. The information comes from a DU side. The content of the system message of the configuration information of the broadcast service or multicast service is thus generated by the DU. However, two solutions of the interaction process at an F1 interface exist for the system message to be encoded, indicated and sent by whom.

Figure 9:
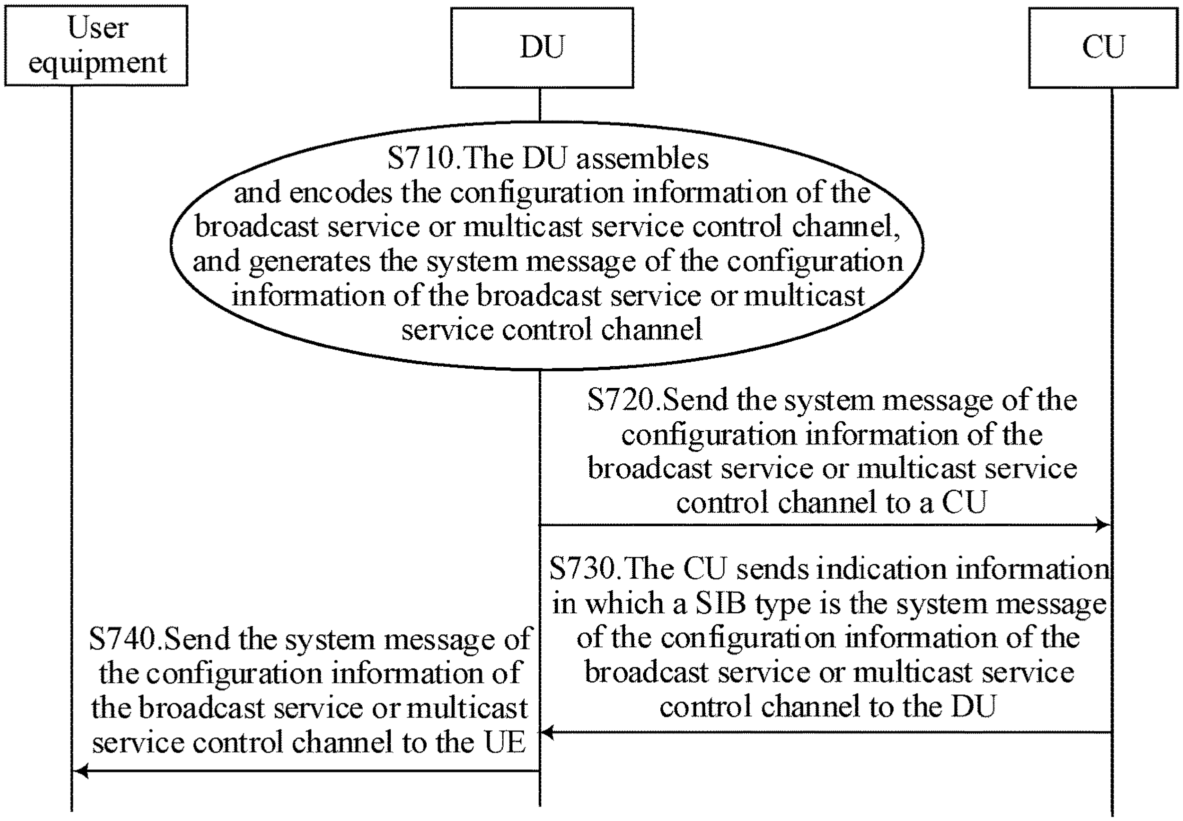
FIG. 9 is an interaction flowchart of a system message of configuration information of a broadcast service or multicast service control channel according to an embodiment of the present application.

In solution 1, the configuration information of the broadcast service or multicast service control channel is generated and encoded by the DU side to obtain the system message of the configuration information of the broadcast service or multicast service control channel. FIG. 9 is an interaction flowchart of a system message of configuration information of a broadcast service or multicast service control channel according to an embodiment of the present application. As shown in FIG. 9, the embodiment includes S710 to S740.

In S710, the DU assembles and encodes the configuration information of the broadcast service or multicast service control channel, and generates the system message of the configuration information of the broadcast service or multicast service control channel.

In S720, the system message of the configuration information of the broadcast service or multicast service control channel is sent to a CU.

In S730, the CU sends indication information in which a SIB type is the system message of the configuration information of the broadcast service or multicast service control channel to the DU. In S740, the DU sends the system message of the configuration information of the broadcast service or multicast service control channel to the UE.

In the embodiment, the DU side generates and encodes the configuration information of the broadcast service or multicast service control channel, and assembles the system message of the configuration information of the broadcast service or multicast service control channel. The DU carries the assembled system message of the configuration information of the broadcast service or multicast service control channel in a gNB-DU system message, and notifies the CU of the assembled system message of the configuration information of the broadcast service or multicast service control channel through an F1 setup request message, a gNB-DU configuration update message or other F1 messages. The CU then indicates at the F1 interface an air interface of the DU sending the assembled system message of the configuration information of the broadcast service or multicast service control channel to the UE. In an embodiment, the CU does not indicate the DU to send, the DU periodically broadcasts the system message of the configuration information of the broadcast service or multicast service control channel.

Figure 10:
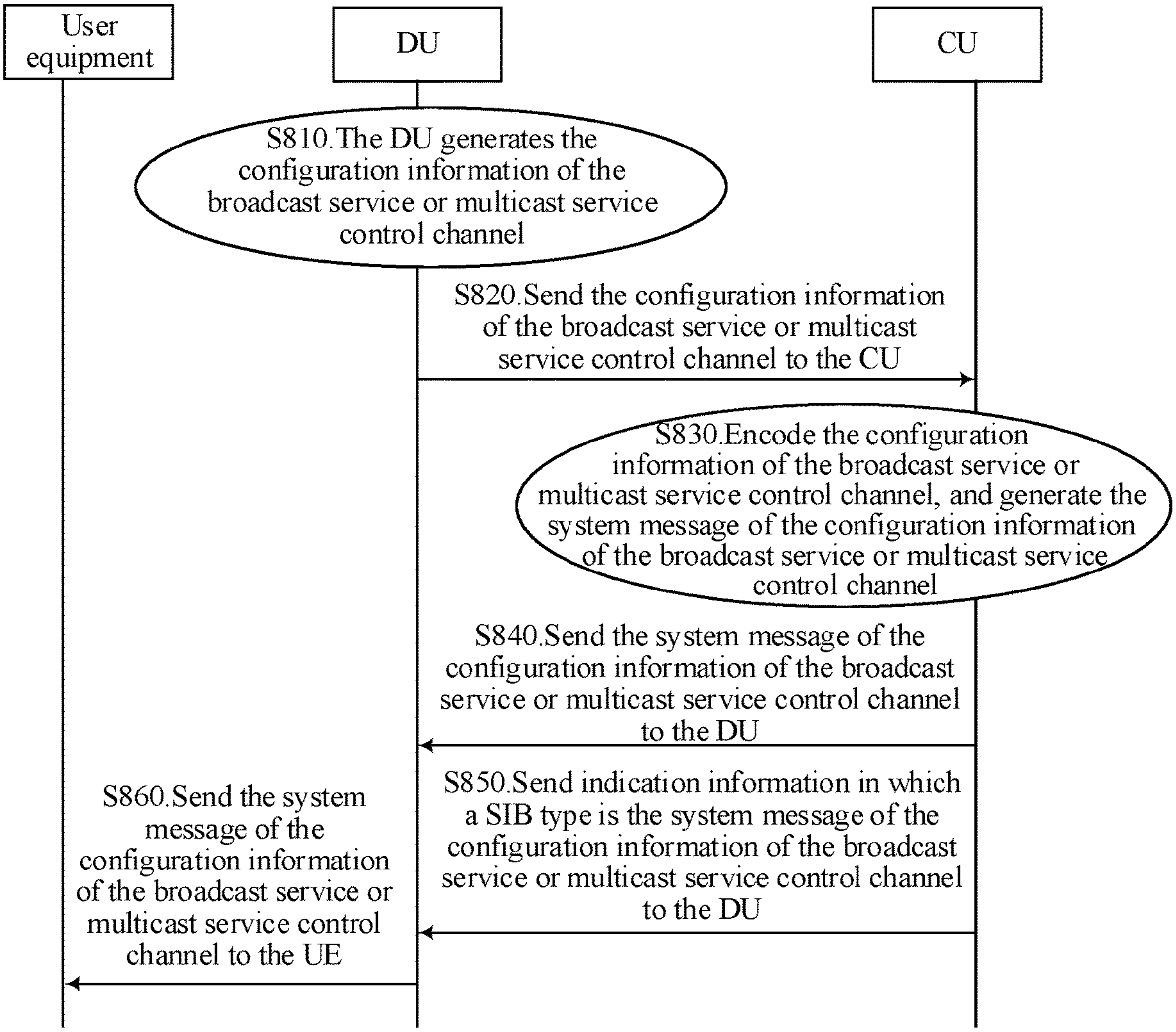
FIG. 10 is another interaction flowchart of a system message of configuration information of a broadcast service or multicast service control channel according to an embodiment of the present application.

In solution 2, the configuration information of the broadcast service or multicast service control channel is generated by the DU side, and is assembled and encoded by the CU side to obtain the system message of the configuration information of the broadcast service or multicast service control channel. FIG. 10 is an interaction flowchart of another system message of configuration information of a broadcast service or multicast service control channel according to an embodiment of the present application. As shown in FIG. 10, the embodiment includes S810 to S860.

In S810, the DU generates the configuration information of the broadcast service or multicast service control channel.

In S820, the DU sends the configuration information of the broadcast service or multicast service control channel to the CU.

In S830, the configuration information of the broadcast service or multicast service control channel is encoded, and the system message of the configuration information of the broadcast service or multicast service control channel is generated.

In S840, the CU sends the system message of the configuration information of the broadcast service or multicast service control channel to the DU.

In S850, the CU sends indication information in which a SIB type is the system message of the configuration information of the broadcast service or multicast service control channel to the DU.

In S860, the DU sends the system message of the configuration information of the broadcast service or multicast service control channel to the UE.

In the embodiment, the DU side generates the configuration information of the broadcast service or multicast service control channel but does not perform encoding, and then the DU carries the configuration information of the broadcast service or multicast service control channel in a gNB-DU system message, and notifies the CU of the configuration information of the broadcast service or multicast service control channel through an F1 setup request message, a gNB-DU configuration update message or other F1 messages. After receiving the configuration information of the broadcast service or multicast service control channel, the CU assembles and encodes the configuration information of the broadcast service or multicast service control channel to obtain the system message of the configuration information of the broadcast service or multicast service. The CU carries the assembled and encoded system message of the configuration information of the broadcast service or multicast service in a SIB message cell of a gNB-CU system message, and sends the assembled and encoded system message of the configuration information of the broadcast service or multicast service in the form of a byte stream to the DU through an F1 setup response message, a gNB-CU configuration update message, a gNB-CU configuration update confirmation message or other F1 messages. The CU then indicates at the F1 interface an air interface of the DU sending the assembled and encoded system message of the configuration information of the broadcast service or multicast service to the UE. In an embodiment, the CU does not indicate the DU to send, the DU periodically broadcasts the system message of the configuration information of the broadcast service or multicast service.

For the preceding two solutions, for the assembled system message of the configuration information of the broadcast service or multicast service, broadcast sending or on-demand broadcast sending at an air interface are both supported, that is, the CU side sends the system message of the configuration information of the broadcast service or multicast service based on an application request of the UE. In the embodiment, the transmission of the system message of the configuration information of the broadcast service or multicast service is also different when the UE is in different states. For an idle UE or an inactive UE, the UE applies for the system message of the configuration information of the broadcast service or multicast service from the DU through msg1 or msg3 at an air interface. After receiving the application, the DU notifies the CU of a UE list carrying requirements of the system message of the configuration information of the broadcast service or multicast service through an F1 message (such as a gNB-DU configuration update message, a gNB-CU configuration update confirmation message or other F1 messages). The CU then delivers a response message or other F1 messages through a system message to indicate the air interface of the DU sending the system message of the configuration information of the broadcast service or multicast service.

For a connected UE, the UE sends a dedicated RRC message to request the system message of the configuration information of the broadcast service or multicast service from the CU, and then the CU indicates the DU sending the system message of the configuration information of the broadcast service or multicast service. In addition, the base station indicates through an RRC message to the UE supporting on-demand sending of the system message of the configuration information of the broadcast service or multicast service.

Moreover, if the base station intends to send the system message of the configuration information of the broadcast service or multicast service, the base station indicates scheduling information of the system message of the configuration information of the broadcast service or multicast service by broadcasting SIB1 during a cell in advance, where the scheduling information includes a broadcast start position of the system message of the configuration information of the broadcast service or multicast service, a sending period of the system message of the configuration information of the broadcast service or multicast service and a sending window length of the system message of the configuration information of the broadcast service or multicast service. The UE may receive the system message of the configuration information of the broadcast service or multicast service sent by the base station on a DL-SCH through an SI-RNTI.

Figure 11:
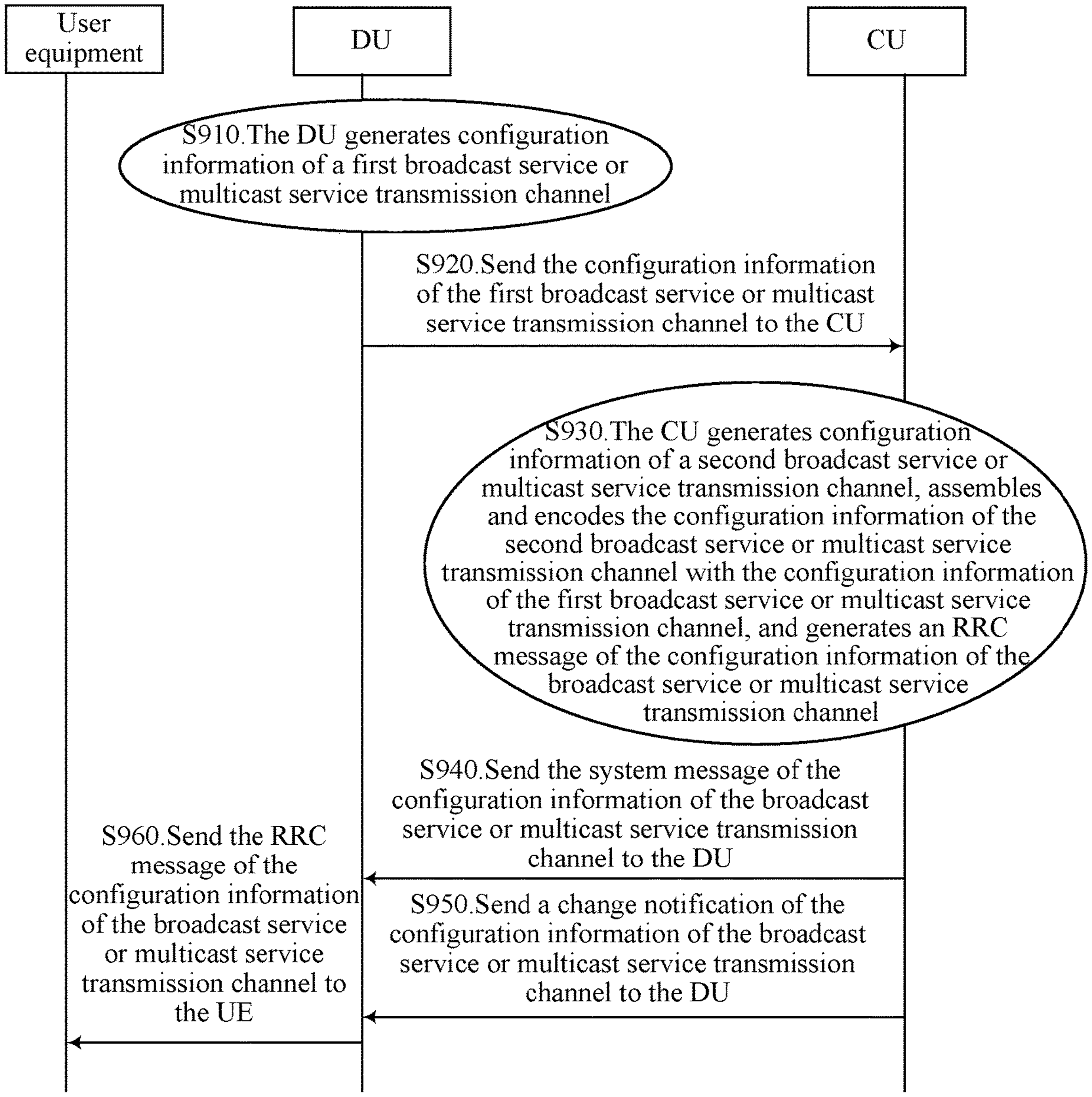
FIG. 11 is an interaction flowchart of an RRC message of configuration information of a broadcast service or multicast service transmission channel according to an embodiment of the present application.

In an embodiment, it can be seen from information contained in the preceding configuration information of the broadcast service or multicast service transmission channel that information contained in the configuration information of the broadcast service or multicast service transmission channel is partly generated by the DU and partly generated by the CU. The interaction process of the configuration information of the broadcast service or multicast service transmission channel at the F1 interface between the CU and the DU is described. In the embodiment, the generation and sending process of the configuration information of the broadcast service or multicast service transmission channel includes the following. The DU side generates configuration information of a broadcast service or multicast service transmission channel of the DU side, and sends the configuration information of the broadcast service or multicast service transmission channel of the DU side to the CU; and then the CU generates configuration information of the broadcast service or multicast service transmission channel of the CU side, and the CU assembles and encodes together the configuration information of the broadcast service or multicast service transmission channel of the DU side and the configuration information of the broadcast service or multicast service transmission channel of the CU side to obtain a system message of the configuration information of the broadcast service or multicast service transmission channel. FIG. 11 is an interaction flowchart of an RRC message of configuration information of a broadcast service or multicast service transmission channel according to an embodiment of the present application. As shown in FIG. 11, the embodiment includes S910 to S940.

In S910, the DU generates configuration information of a first broadcast service or multicast service transmission channel.

In the embodiment, the configuration information of the first broadcast service or multicast service transmission channel refers to the configuration information of the broadcast service or multicast service transmission channel related to the DU side.

In the embodiment, the DU side generates the configuration information of the broadcast service or multicast service transmission channel related to the DU, and notifies the CU of the configuration information of the broadcast service or multicast service transmission channel related to the DU through an RRC message cell in an MBMS context setup response message, an RRC message cell in an MBMS context modification response (the initialization of the CU) message or an RRC message cell in an MBMS context modification confirmation (the initialization of the DU) message. In the embodiment, the configuration information of the broadcast service or multicast service transmission channel related to the DU side includes a list of the configuration information of the broadcast service or multicast service transmission channel. Configuration information of a broadcast service or multicast service transmission channel of each DU side includes configuration information of a broadcast service or multicast service control channel; scheduling configuration information of the broadcast service or multicast service transmission channel and bearer configuration information of RLC of a broadcast service or multicast service. The scheduling configuration information of the broadcast service or multicast service transmission channel includes any combination or at least one of following information: a persistent timer of the broadcast service or multicast service transmission channel, a timer related to DRX of the broadcast service or multicast service transmission channel, a scheduling period of the broadcast service or multicast service transmission channel, a scheduling offset of the broadcast service or multicast service transmission channel or a bandwidth part identifier of the broadcast service or multicast service transmission channel.

In the embodiment, the bearer configuration information of the RLC of the broadcast service or multicast service includes at least one of: identification information of an air interface radio bearer of the broadcast service or multicast service, a sequence number length of an RLC layer, a reassembly timer or a logical channel identifier.

In S920, the DU sends the configuration information of the first broadcast service or multicast service transmission channel to the CU.

In S930, the CU generates configuration information of a second broadcast service or multicast service transmission channel, assembles and encodes the configuration information of the second broadcast service or multicast service transmission channel with the configuration information of the first broadcast service or multicast service transmission channel, and generates an RRC message of the configuration information of the broadcast service or multicast service transmission channel.

In the embodiment, the configuration information of the second broadcast service or multicast service transmission channel refers to the configuration information of the broadcast service or multicast service transmission channel related to the CU side. The CU side generates the configuration information of the broadcast service or multicast service transmission channel related to the CU, and the configuration information of the broadcast service or multicast service transmission channel related to the CU includes a list of the configuration information of the broadcast service or multicast service transmission channel. Configuration information of a broadcast service or multicast service transmission channel of each CU side includes any combination or at least one of: system information of a broadcast service or multicast service, configuration information of the broadcast service or multicast service transmission channel, bearer configuration information of a broadcast service or multicast service or a change notification of configuration information of a broadcast service or multicast service.

In the embodiment, configuration information of a broadcast service or multicast service of the each CU side may further include bearer configuration information of the broadcast service or multicast service, and the bearer configuration information of the broadcast service or multicast service includes any combination or at least one of the following information: identification information of the broadcast service or multicast service, radio air interface identification information of the broadcast service or multicast service, Service Area Identifier information of the broadcast service or multicast service, a neighbor list, configuration information of an air interface radio bearer of the broadcast service or multicast service or an air interface transmission mode indication of the broadcast service or multicast service, where the air interface transmission mode indication of the broadcast service or multicast service includes: a unicast transmission indication or a multicast transmission indication. In the embodiment, the configuration information of the air interface radio bearer of the broadcast service or multicast service includes any combination or at least one of the following information: identification information of the air interface radio bearer of the broadcast service or multicast service, a sequence number length of a PDCP layer, a maximum context identifier, a reordering timer, a sequence number length of an RLC layer or a reassembly timer. In the embodiment, after generating the preceding configuration information (that is, the configuration information of the second broadcast service or multicast service transmission channel) of the broadcast service or multicast service transmission channel of the CU side, the CU combines and assembles the configuration information of the broadcast service or multicast service transmission channel of the CU side and the configuration information (that is, the configuration information of the first broadcast service or multicast service transmission channel) of the broadcast service or multicast service transmission channel of the DU side reported by the DU into an RRC message of the configuration information of the broadcast service or multicast service transmission channel.

In S940, the CU sends the RRC message of the configuration information of the broadcast service or multicast service transmission channel to the DU.

In the embodiment, the CU delivers the RRC message of the configuration information of the broadcast service or multicast service transmission channel to the DU through an F1 message (such as an MBMS context setup request message, an MBMS context modification request message, an MBMS context modification confirmation message or other RRC messages) at the F1 interface to indicate the DU sending the RRC message of the configuration information of the broadcast service or multicast service transmission channel to the UE at an air interface.

In S950, the CU sends a change notification of the configuration information of the broadcast service or multicast service transmission channel to the DU.

In S960, the DU sends the RRC message of the configuration information of the broadcast service or multicast service transmission channel to the UE.

In the embodiment, the UE receives the RRC message from the DU to acquire the configuration information of the broadcast service or multicast service transmission channel, reads broadcast service or multicast service bearer information, that is, MBMS Radio Bearer (MRB) information, of the broadcast service or multicast service transmission channel, and receives broadcast service data content.

In the embodiment, if the preceding configuration information of the broadcast service or multicast service transmission channel sent by the CU does not include the scheduling configuration information of the broadcast service or multicast service transmission channel or a Global System for Mobile Communications Radio Network Temporary Identity (G-RNTI), but includes identification information for uniquely specifying the broadcast service or multicast service or TMGI information of the broadcast/multicast service, it means that the UE may send, after entering a connected state, an RRC message (such as an MBMS interest indication) to a gNB that UE is interested in receiving the broadcast/multicast service, and the gNB may send the scheduling configuration information of the broadcast service or multicast service transmission channel or the G-RNTI to the UE through a dedicated RRC message, such as an RRC reconfiguration message.

In the embodiment, if the preceding configuration information of the broadcast service or multicast service transmission channel sent by the CU includes indication information for unicast transmission, it means that the UE may send, after entering a connected state, an RRC message (such as an MBMS interest indication) to a gNB that the UE is interested in receiving the broadcast service or multicast service, and the gNB may subsequently send broadcast service data or multicast service data to the UE by means of unicast.

In the embodiment, when the broadcast service or multicast service bearer, that is, the MRB, is created, modified or released between the CU and the DU, it means that the configuration information of the broadcast service or multicast service transmission channel is modified accordingly. The CU needs to send the change indication information of the configuration information of the broadcast service or multicast service transmission channel to the DU through an MBMS context setup request message, an MBMS context modification request (the initialization of the CU) message, an MBMS context modification confirmation (the initialization of the DU) message or other F1 messages at the F1 interface. At the same time, the CU also needs to send the newly generated configuration information of the broadcast service or multicast service transmission channel after modification to the DU. After receiving the change indication of the configuration information of the broadcast service or multicast service transmission channel, the DU sends downlink control information (DCI) to the UE to indicate the change of the configuration information of the broadcast service or multicast service transmission channel. At the same time, the DU sends the received newly-generated configuration information of the broadcast service or multicast service transmission channel to the UE at an air interface.

In an implementation, in the 5G NR system, a network side of a radio access network provides a service of a broadcast service or multicast service for a UE. The network side sends a system message of configuration information of a broadcast service or multicast service channel to the UE, and the UE retrieves the broadcast service or multicast service channel of the cell from the system message of the configuration information of the broadcast service or multicast service channel. The UE may receive broadcast service data or multicast service data content on a broadcast service or multicast service transmission channel on the broadcast service or multicast service channel.

In the preceding transmission process, configuration information of the broadcast service or multicast service transmission channel carries any combination or at least one of: identification information of a broadcast service or multicast service; radio air interface identification information of a broadcast service or multicast service or a list of the configuration information of the broadcast service or multicast service channel. A list of configuration information of each broadcast service or multicast service channel includes any combination or at least one of: Service Area Identifier information of the broadcast service or multicast service, a neighbor list, an identifier of a cell where the broadcast or multicast is located or scheduling configuration information of the broadcast service or multicast service transmission channel. The scheduling configuration information of the broadcast service or multicast service transmission channel includes any combination or at least one of following information: a persistent timer of the broadcast service or multicast service transmission channel, a timer related to DRX of the broadcast service or multicast service transmission channel, a scheduling period of the broadcast service or multicast service transmission channel, a scheduling offset of the broadcast service or multicast service transmission channel or a bandwidth part identifier of the broadcast service or multicast service transmission channel.

In the embodiment, configuration information of the preceding broadcast service or multicast service may further include bearer configuration information of the broadcast service or multicast service, and the bearer configuration information of the broadcast service or multicast service includes any combination or at least one of the following information: identification information of the broadcast service or multicast service, radio air interface identification information of the broadcast service or multicast service, Service Area Identifier information of the broadcast service or multicast service, a neighbor list, configuration information of an air interface radio bearer of the broadcast service or multicast service or an air interface transmission mode indication of the broadcast service or multicast service, where the air interface transmission mode indication of the broadcast service or multicast service includes: a unicast transmission indication or a multicast transmission indication. The configuration information of the air interface radio bearer of the broadcast service or multicast service includes any combination or at least one of the following information: identification information of the air interface radio bearer of the broadcast service or multicast service, a sequence number length of a PDCP layer, a maximum context identifier, a reordering timer, a sequence number length of an RLC layer or a reassembly timer. In the embodiment, the preceding configuration information of the broadcast service or multicast service may further include a unicast indication (an indication for indicating that an MBMS broadcast service or multicast service may be used for unicast transmission).

Figure 12:
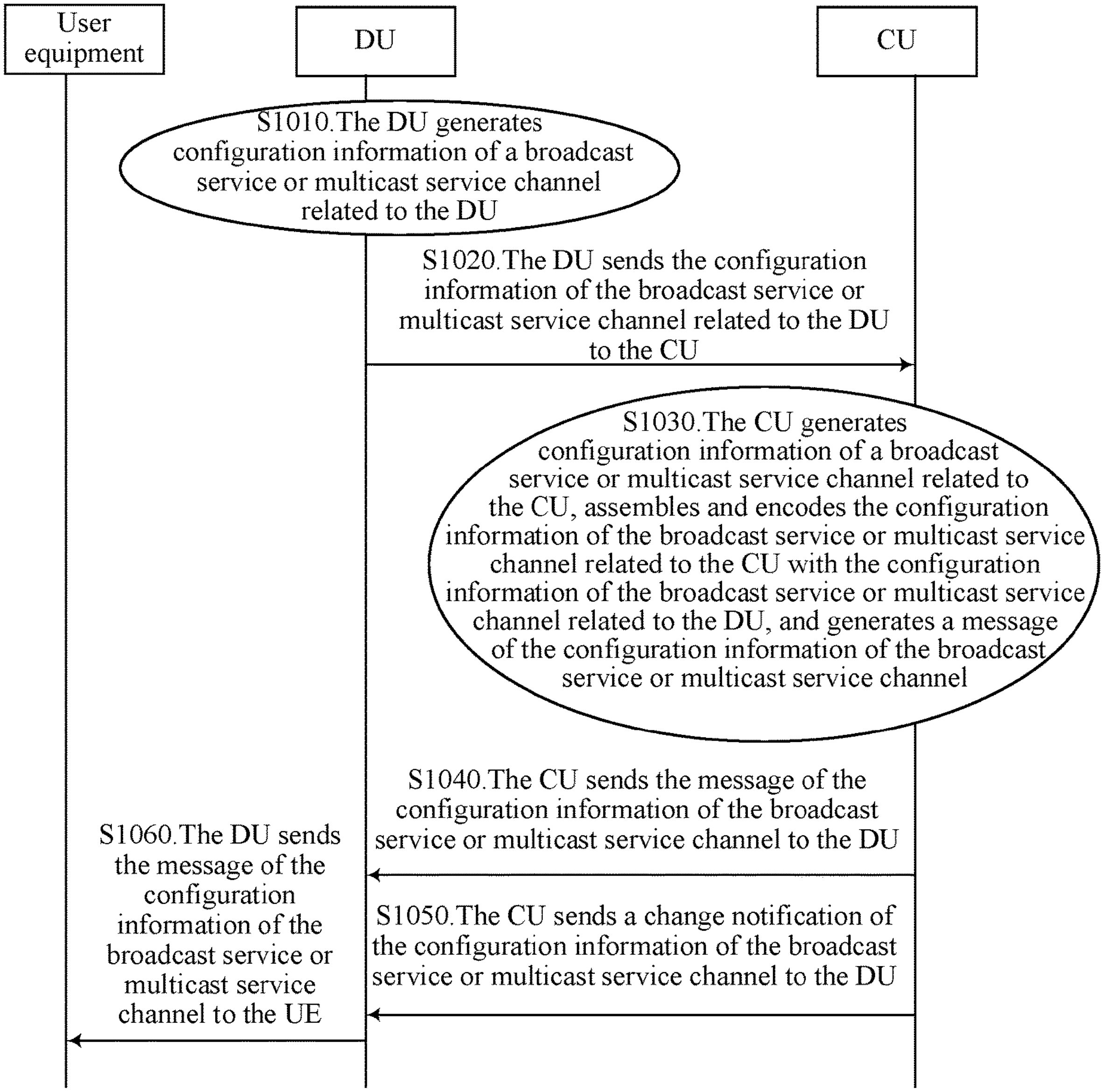
FIG. 12 is an interaction flowchart of configuration information of a broadcast service or multicast service channel according to an embodiment of the present application.

It can be seen from information contained in the preceding system message of the configuration information of the broadcast service or multicast service channel that information contained in the configuration information of the broadcast service or multicast service channel is partly generated by a DU and partly generated by a CU. The interaction of the configuration information of the broadcast service or multicast service channel at the F1 interface between the CU and the DU is described. FIG. 12 is an interaction flowchart of configuration information of a broadcast service or multicast service channel according to an embodiment of the present application. As shown in FIG. 12, in the embodiment, the generation and sending process of the configuration information of the broadcast service or multicast service channel includes S1010 to S1060.

In S1010, the DU generates configuration information of a broadcast service or multicast service channel related to the DU.

In the embodiment, the DU side generates the configuration information of the broadcast service or multicast service channel related to the DU, and notifies the CU of the configuration information of the broadcast service or multi cast service channel related to the DU through an MBMS context setup response message, an MBMS context modification response (the initialization of the CU) message, an MBMS context modification confirmation (the initialization of the DU) message or other F1 messages. In the embodiment, the configuration information of the broadcast service or multicast service channel related to the DU includes a list of the configuration information of the broadcast service or multicast service channel. Configuration of each broadcast service or multicast service channel includes scheduling configuration information of the each broadcast service or multicast service channel. In the embodiment, the scheduling configuration information of the each broadcast service or multicast service channel includes any combination or at least one of following information: a persistent timer of the each broadcast service or multicast service channel, a timer related to DRX of the each broadcast service or multicast service channel, a scheduling period of the each broadcast service or multicast service channel, a scheduling offset of the each broadcast service or multicast service channel or a bandwidth part identifier of the each broadcast service or multicast service channel.

In the embodiment, the scheduling configuration information of the each broadcast service or multicast service channel may further include bearer configuration information of the broadcast service or multicast service, and the bearer configuration information of the broadcast service or multicast service includes any combination or at least one of the following information: identification information of an air interface radio bearer of the broadcast service or multicast service, a sequence number length of an RLC layer or a reassembly timer.

In S1020, the DU sends the configuration information of the broadcast service or multicast service channel related to the DU to the CU.

In S1030, the CU generates configuration information of a broadcast service or multicast service channel related to the CU, assembles and encodes the configuration information of the broadcast service or multicast service channel related to the CU with the configuration information of the broadcast service or multicast service channel related to the DU, and generates a message of the configuration information of the broadcast service or multicast service channel.

In the embodiment, the CU side generates the configuration information of the broadcast service or multicast service channel related to the CU, and the configuration information of the broadcast service or multicast service channel related to the CU includes a list of the configuration information of the broadcast service or multicast service channel. The configuration information of the each broadcast service or multicast service channel includes any combination or at least one of: identification information of the broadcast service or multicast service, radio air interface identification information of the broadcast service or multicast service, Service Area Identifier information of the broadcast service or multicast service or a neighbor list. In the embodiment, the message of the configuration information of the broadcast service or multicast service channel may be a system message or an RRC message.

In the embodiment, the configuration information of the each broadcast service or multicast service channel may further include bearer configuration information of the broadcast service or multicast service, and the bearer configuration information of the broadcast service or multicast service includes any combination or at least one of the following information: identification information of the broadcast service or multicast service, radio air interface identification information of the broadcast service or multicast service, Service Area Identifier information of the broadcast service or multicast service, a neighbor list, configuration information of an air interface radio bearer of the broadcast service or multicast service or an air interface transmission mode indication of the broadcast service or multicast service, where the air interface transmission mode indication of the broadcast service or multicast service includes: a unicast transmission indication or a multicast transmission indication. The configuration information of the air interface radio bearer of the broadcast service or multicast service includes any combination or at least one of the following information: identification information of the air interface radio bearer of the broadcast service or multicast service, a sequence number length of a PDCP layer, a maximum context identifier, a reordering timer, a sequence number length of an RLC layer or a reassembly timer.

In S1040, the CU sends the message of the configuration information of the broadcast service or multicast service channel to the DU.

In the embodiment, after generating the preceding configuration information of the broadcast/multicast service channel of the CU side, the CU combines and assembles the preceding configuration information of the broadcast/multicast service channel of the CU side and the configuration information of the broadcast/multicast service channel of the DU side reported by the DU into the message of the configuration information of the broadcast service or multicast service channel, and delivers system message information of the configuration information of the broadcast service or multicast service channel to the DU through an MBMS context setup request message, an MBMS context modification request (the initialization of the CU) message, an MBMS context modification confirmation (the initialization of the DU) message or other F1 messages. In S1050, the CU sends a change notification of the configuration information of the broadcast service or multicast service channel to the DU.

In S1060, the DU sends the message of the configuration information of the broadcast service or multicast service channel to the UE.

In the embodiment, after receiving the message of the configuration information of the broadcast service or multicast service channel, the DU sends the message of the configuration information of the broadcast service or multicast service channel to the UE through an air interface. The UE acquires the configuration information of the broadcast service or multicast service channel from the message of the configuration information of the broadcast service or multicast service channel received from the DU, reads a broadcast service or multicast service bearer, that is, an MRB, of the broadcast service or multicast service channel, and receives broadcast service data content.

In the embodiment, if the preceding configuration information of the broadcast service or multicast service channel sent by the CU does not include the scheduling configuration information of the broadcast service or multicast service channel or a G-RNTI, but includes identification information for uniquely specifying the broadcast service or multicast service or TMGI information of the broadcast service or multicast service, it means that the UE may send, after entering a connected state, an RRC message (such as an MBMS interest indication) to a gNB that the UE is interested in receiving the broadcast/multicast service, and the gNB may send the service channel scheduling configuration information of the broadcast service or multicast service channel or the G-RNTI to the UE through a dedicated RRC message, such as an RRC reconfiguration message.

In the embodiment, if the preceding configuration information of the broadcast service or multicast service channel sent by the CU includes indication information for unicast transmission, it means that the UE may send, after entering a connected state, an RRC message (such as an MBMS interest indication) to a gNB to be interested in receiving the broadcast service or multicast service, and the gNB may subsequently send broadcast service data or multicast service data to the UE by means of unicast.

In the embodiment, when the broadcast service or multicast service bearer, that is, the MRB, is created, modified or released between the CU and the DU, it means that the configuration information of the broadcast service or multicast service channel is modified accordingly. The CU needs to send the change indication information of the configuration information of the broadcast service or multicast service channel to the DU through an MBMS context setup request message, an MBMS context modification request (the initialization of the CU) message, an MBMS context modification confirmation (the initialization of the DU) message or other F1 messages at the F1 interface. At the same time, the CU also sends the newly generated configuration information of the broadcast/multicast service channel after modification to the DU. After receiving the change indication of the configuration information of the broadcast service or multicast service channel, the DU sends DCI to the UE to indicate the change of the configuration information of the broadcast/multicast service channel. At the same time, the DU sends the received newly-generated configuration information of the broadcast service or multicast service channel to the UE at an air interface.

Figure 13:
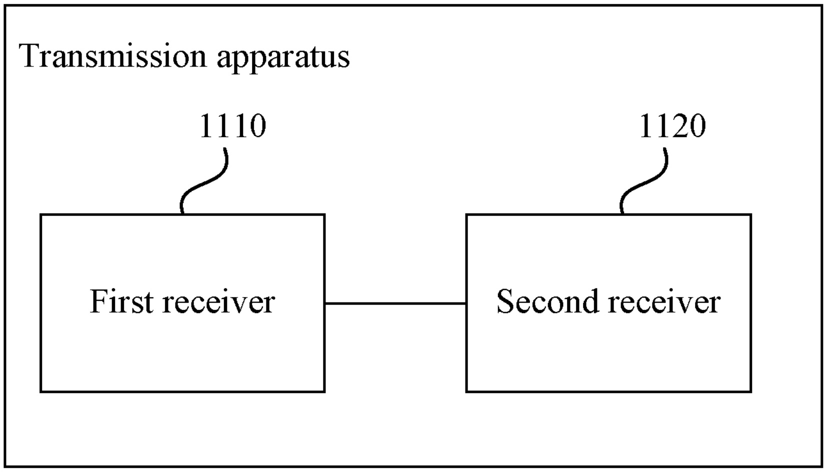
FIG. 13 is a block diagram of a transmission apparatus according to an embodiment of the present application.

In an embodiment, FIG. 13 is a block diagram of a transmission apparatus according to an embodiment of the present application. The embodiment is applied to a first communication node.

As shown in FIG. 13, the embodiment includes a first receiver 1110 and a second receiver 1120.

The first receiver 1110 is configured to receive configuration information of a broadcast service or multicast service from a second communication node; and the second receiver 1120 is configured to receive broadcast service data or multicast service data according to the configuration information of the broadcast service or multicast service.

The transmission apparatus provided in the embodiment is configured to implement the transmission method of the embodiment shown in FIG. 1. The transmission apparatus provided in the embodiment has similar implementation principles and technical effects which are not repeated here.

In an embodiment, the second communication node includes one of: a base station or a distributed unit of a base station.

In an embodiment, the configuration information of the broadcast service or multicast service includes at least one of: system information of the broadcast service or multicast service, configuration information of a broadcast service or multicast service control channel, configuration information of a broadcast service or multicast service transmission channel or bearer configuration information of the broadcast service or multicast service.

In an embodiment, the system information of the broadcast service or multicast service includes at least one of: a service area list supported on a current frequency, a service area list supported on an adjacent frequency, a downlink frequency of an adjacent carrier or identification information of the broadcast service or multicast service.

In an embodiment, in a case where the configuration information of the broadcast service or multicast service includes the system information of the broadcast service or multicast service, receiving the configuration information of the broadcast service or multicast service from the second communication node includes the following. The information of the broadcast service or multicast service is received through a system message or a dedicated RRC message.

In an embodiment, the configuration information of the broadcast service or multicast service control channel includes at least one of: identification information of the broadcast service or multicast service, a repetition period of the broadcast service or multicast service control channel, an offset of the broadcast service or multicast service control channel, a start slot of the broadcast service or multicast service control channel, a duration of the broadcast service or multicast service control channel, a modification period of the broadcast service or multicast service control channel or a bandwidth part identifier of the broadcast service or multicast service control channel.

In an embodiment, in a case where the configuration information of the broadcast service or multicast service includes the configuration information of the broadcast service or multicast service control channel, receiving the configuration information of the broadcast service or multicast service from the second communication node includes the following.

The configuration information of the broadcast service or multicast service control channel is received through a system message or a dedicated RRC message.

In an embodiment, the configuration information of the broadcast service or multicast service transmission channel includes at least one of: identification information of the broadcast service or multicast service, radio air interface identification information of the broadcast/multicast service, Service Area Identifier information of the broadcast service or multicast service, a neighbor list or scheduling configuration information of the broadcast service or multicast service transmission channel.

In an embodiment, the scheduling configuration information of the broadcast service or multicast service transmission channel includes: a persistent timer of the broadcast service or multicast service transmission channel, a timer related to DRX of the broadcast service or multicast service transmission channel, a scheduling period of the broadcast service or multicast service transmission channel, a scheduling offset of the broadcast service or multicast service transmission channel or a bandwidth part identifier of the broadcast service or multicast service transmission channel.

In an embodiment, in a case where the configuration information of the broadcast service or multicast service includes the configuration information of the broadcast service or multicast service transmission channel, receiving the configuration information of the broadcast service or information of the broadcast service or multicast service transmission channel is received through a system message, an RRC message transmitted on the broadcast service or multicast service control channel or a dedicated RRC message.

In an embodiment, the bearer configuration information of the broadcast service or multicast service includes at least one of: identification information of the broadcast service or multicast service, radio air interface identification information of the broadcast service or multicast service, Service Area Identifier information of the broadcast service or multicast service, a neighbor list, configuration information of an air interface radio bearer of the broadcast service or multicast service or an air interface transmission mode indication of the broadcast service or multicast service, where the air interface transmission mode indication of the broadcast service or multicast service includes: a unicast transmission indication or a multicast transmission indication.

In an embodiment, the configuration information of the air interface radio bearer of the broadcast service or multicast service includes at least one of: identification information of the air interface radio bearer of the broadcast service or multicast service, a sequence number length of a PDCP layer, a maximum context identifier, a reordering timer, a sequence number length of an RLC layer or a reassembly timer.

In an embodiment, in a case where the configuration information of the broadcast service or multicast service includes the bearer configuration information of the broadcast service or multicast service, receiving the configuration information of the broadcast service or multicast service from the second communication node includes the following. The bearer configuration information of the broadcast service or multicast service is received through a system message, an RRC message transmitted on the broadcast service or multicast service control channel or a dedicated RRC message; or the bearer configuration information of the broadcast service or multicast service is configured by default.

Figure 14:
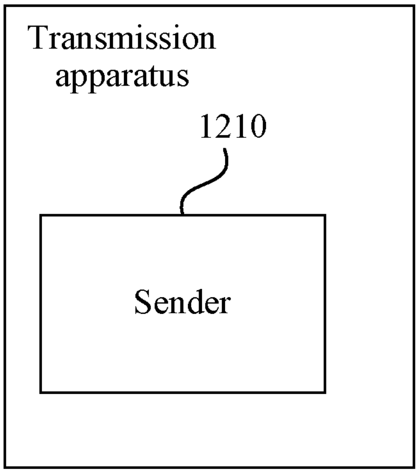
FIG. 14 is a block diagram of another transmission apparatus according to an embodiment of the present application.

In an embodiment, FIG. 14 is a block diagram of another transmission apparatus according to an embodiment of the present application. The embodiment is applied to a second communication node. As shown in FIG. 14, the embodiment includes a sender 1210.

The sender 1210 is configured to send configuration information of a broadcast service or multicast service to a first communication node.

The transmission apparatus provided in the embodiment is configured to implement the transmission method of the embodiment shown in FIG. 2. The transmission apparatus provided in the embodiment has similar implementation principles and technical effects which are not repeated here.

In an embodiment, the second communication node includes one of: a base station or a distributed unit of a base station.

In an embodiment, the configuration information of the broadcast service or multicast service includes at least one of: system information of the broadcast service or multicast service, configuration information of a broadcast service or multicast service control channel, configuration information of a broadcast service or multicast service transmission channel or bearer configuration information of the broadcast service or multicast service.

In an embodiment, the system information of the broadcast service or multicast service includes at least one of: a service area list supported on a current frequency, a service area list supported on an adjacent frequency, a downlink frequency of an adjacent carrier or identification information of the broadcast service or multicast service.

In an embodiment, in a case where the configuration information of the broadcast service or multicast service includes the system information of the broadcast service or multicast service, sending the configuration information of the broadcast service or multicast service to the first communication node includes the following. The information of the broadcast service or multicast service is sent to the first communication node through a system message or a dedicated RRC message.

In an embodiment, the configuration information of the broadcast service or multicast service control channel includes at least one of: identification information of the broadcast service or multicast service, a repetition period of the broadcast service or multicast service control channel, an offset of the broadcast service or multicast service control channel, a start slot of the broadcast service or multicast service control channel, a duration of the broadcast service or multicast service control channel, a modification period of the broadcast service or multicast service control channel or a bandwidth part identifier of the broadcast service or multicast service control channel.

In an embodiment, in a case where the configuration information of the broadcast service or multicast service includes the configuration information of the broadcast service or multicast service control channel, sending the configuration information of the broadcast service or multicast service to the first communication node includes the following. The configuration information of the broadcast service or multicast service control channel is sent to the first communication node through a system message or a dedicated RRC message.

In an embodiment, the configuration information of the broadcast service or multicast service transmission channel includes at least one of: identification information of the broadcast service or multicast service, radio air interface identification information of the broadcast/multicast service, Service Area Identifier information of the broadcast service or multicast service, a neighbor list or scheduling configuration information of the broadcast service or multicast service transmission channel.

In an embodiment, the scheduling configuration information of the broadcast service or multicast service transmission channel includes: a persistent timer of the broadcast service or multicast service transmission channel, a timer related to DRX of the broadcast service or multicast service transmission channel, a scheduling period of the broadcast service or multicast service transmission channel, a scheduling offset of the broadcast service or multicast service transmission channel or a bandwidth part identifier of the broadcast service or multicast service transmission channel.

In an embodiment, in a case where the configuration information of the broadcast service or multicast service includes the configuration information of the broadcast service or multicast service transmission channel, sending the configuration information of the broadcast service or multicast service to the first communication node includes the following. The configuration information of the broadcast service or multicast service transmission channel is sent to the first communication node through a system message, an RRC message transmitted on the broadcast service or multicast service control channel or a dedicated RRC message.

In an embodiment, the bearer configuration information of the broadcast service or multicast service includes at least one of: identification information of the broadcast service or multicast service, radio air interface identification information of the broadcast service or multicast service, Service Area Identifier information of the broadcast service or multicast service, a neighbor list, configuration information of an air interface radio bearer of the broadcast service or multicast service or an air interface transmission mode indication of the broadcast service or multicast service, where the air interface transmission mode indication of the broadcast service or multicast service includes: a unicast transmission indication or a multicast transmission indication.

In an embodiment, the configuration information of the air interface radio bearer of the broadcast service or multicast service includes at least one of: identification information of the air interface radio bearer of the broadcast service or multicast service, a sequence number length of a PDCP layer, a maximum context identifier, a reordering timer, a sequence number length of an RLC layer or a reassembly timer.

In an embodiment, attribute information of service quality of the air interface radio bearer of the broadcast service or multicast service includes at least one of: identification information of the air interface radio bearer of the broadcast service or multicast service, an air interface service quality parameter of the air interface radio bearer of the broadcast service or multicast service, each piece of data stream identification information mapped to the air interface radio bearer of the broadcast service or multicast service or each air interface service quality parameter mapped to a data stream on the air interface radio bearer of the broadcast service or multicast service.

In an embodiment, in a case where the configuration information of the broadcast service or multicast service includes the bearer configuration information of the broadcast service or multicast service, sending the configuration information of the broadcast service or multicast service to the first communication node includes the following. The bearer configuration information of the broadcast service or multicast service is sent to the first communication node through a system message, an RRC message transmitted on the broadcast service or multicast service control channel or a dedicated RRC message; or the bearer configuration information of the broadcast service or multicast service is configured by default.

Figure 15:
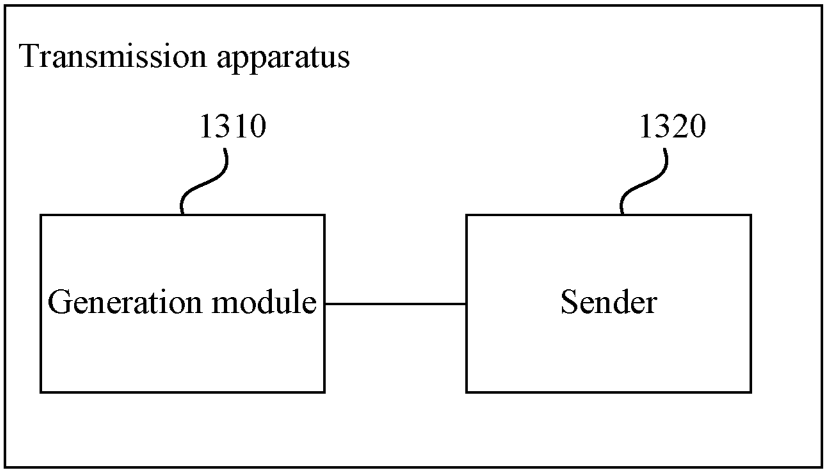
FIG. 15 is a block diagram of another transmission apparatus according to an embodiment of the present application.

In an embodiment, FIG. 15 is a block diagram of another transmission apparatus according to an embodiment of the present application. The embodiment is applied to a third communication node. As shown in FIG. 15, the embodiment includes a generation module 1310 and a sender 1320.

The generation module 1310 is configured to generate configuration information of a first broadcast service or multicast service; and the sender 1320 is configured to send an F1 message carrying the configuration information of the first broadcast service or multicast service to a fourth communication node.

The transmission apparatus provided in the embodiment is configured to implement the transmission method of the embodiment shown in FIG. 3. The transmission apparatus provided in the embodiment has similar implementation principles and technical effects which are not repeated here.

In an embodiment, the configuration information of the first broadcast service or multicast service includes at least one of: configuration information of a broadcast service or multicast service control channel, scheduling configuration information of a broadcast service or multicast service transmission channel or bearer configuration information of RLC of a broadcast service or multicast service.

In an embodiment, the configuration information of the first broadcast service or multicast service includes at least one of: identification information of the broadcast service or multicast service, a repetition period of the broadcast service or multicast service control channel, an offset of the broadcast service or multicast service control channel, a start slot of the broadcast service or multicast service control channel, a duration of the broadcast service or multicast service control channel, a modification period of the broadcast service or multicast service control channel or a bandwidth part identifier of the broadcast service or multicast service control channel.

In an embodiment, in a case where the configuration information of the first broadcast service or multicast service includes the configuration information of the broadcast service or multicast service control channel, the method applied to the third communication node further includes the following. The configuration information of the broadcast service or multicast service control channel is assembled and encoded, and a message of the configuration information of the broadcast service or multicast service control channel is generated; and the message of the configuration information of the broadcast service or multicast service control channel is sent to a first communication node.

In an embodiment, the transmission method applied to the third communication node further includes the following. A message of configuration information of a third broadcast service or multicast service sent by the fourth communication node is received; and the message carrying the configuration information of the third broadcast service or multicast service is sent to a first communication node.

In an embodiment, the scheduling configuration information of the broadcast service or multicast service transmission channel includes at least one of: a persistent timer of the broadcast service or multicast service transmission channel, a timer related to DRX of the broadcast service or multicast service transmission channel, a scheduling period of the broadcast service or multicast service transmission channel, a scheduling offset of the broadcast service or multicast service transmission channel or a bandwidth part identifier of the broadcast service or multicast service control channel.

In an embodiment, the bearer configuration information of the RLC of the broadcast service or multicast service includes at least one of: identification information of an air interface radio bearer of the broadcast service or multicast service, a sequence number length of an RLC layer, a reassembly timer or a logical channel identifier.

Figure 16:
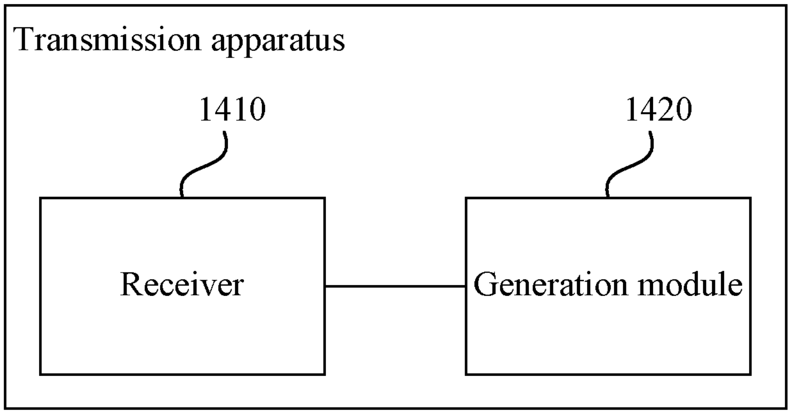
FIG. 16 is a block diagram of another transmission apparatus according to an embodiment of the present application.

In an embodiment, FIG. 16 is a block diagram of another transmission apparatus according to an embodiment of the present application. The embodiment is applied to a fourth communication node. As shown in FIG. 16, the embodiment includes a receiver 1410 and a generation module 1420.

The receiver 1410 is configured to receive configuration information of a first broadcast service or multicast service sent by a third communication node; and the generation module 1420 is configured to generate configuration information of a second broadcast service or multicast service.

The transmission apparatus provided in the embodiment is configured to implement the transmission method of the embodiment shown in FIG. 4. The transmission apparatus provided in the embodiment has similar implementation principles and technical effects which are not repeated here.

In an embodiment, the configuration information of the second broadcast service or multicast service includes at least one of: system information of a broadcast service or multicast service, configuration information of a broadcast service or multicast service transmission channel, bearer configuration information of a broadcast service or multicast service or a change notification of configuration information of a broadcast service or multicast service.

In an embodiment, the transmission method applied to the fourth communication node further includes the following. The configuration information of the first broadcast service or multicast service and the configuration information of the second broadcast service or multicast service are assembled and encoded, and a message of configuration information of a third broadcast service or multicast service is generated; and the message of the configuration information of the third broadcast service or multicast service is sent to the third communication node.

Figure 17:
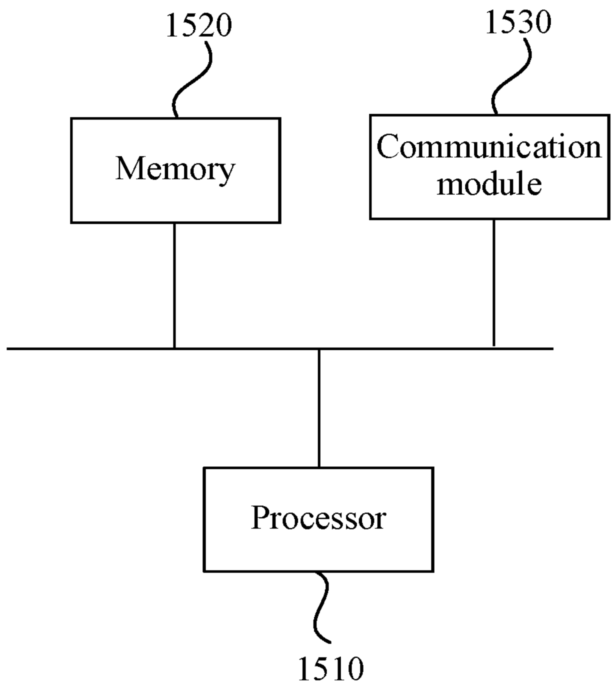
FIG. 17 is a structural diagram of a device according to an embodiment of the present application.

FIG. 17 is a structural diagram of a device according to an embodiment of the present application.

As shown in FIG. 17, the device provided in the present application includes a processor 1510, a memory 1520 and a communication module 1530. One or more processors 1510 may be included in the device. One processor 1510 is shown as an example in FIG. 17. One or more memories 1520 may be included in the device. One memory 1520 is shown as an example in FIG. 17. The processor 1510, the memory 1520 and the communication module 1530 in the device may be connected via a bus or in other manners. The connection via a bus is shown as an example in FIG. 17. In the embodiment, the device is a first communication node. Exemplarily, the first communication node may be a UE.

As a computer-readable storage medium, the memory 1520 may be configured to store software programs and computer-executable programs and modules, such as program instructions/modules (for example, the first receiver 1110 and the second receiver 1120 in the transmission apparatus) corresponding to the device according to any embodiment of the present application. The memory 1520 may include a program storage region and a data storage region. The program storage region may store an operating system and an application program required by at least one function. The data storage region may store data created according to the use of the device. Additionally, the memory 1520 may include a high-speed random-access memory and may also include a nonvolatile memory such as at least one disk memory, flash memory or another nonvolatile solid-state memory. In some examples, the memory 1520 may include memories which are remotely disposed relative to the processor 1510, and these remote memories may be connected to the device via a network. Examples of the preceding network include, but are not limited to, the Internet, an intranet, a local area network, a mobile communication network and a combination thereof.

The communication module 1530 is configured to perform communication interaction between a first communication node, a second communication node, a third communication node and a fourth communication node.

The preceding device may be configured to execute the transmission method applied to the first communication node in any one of the preceding embodiments and has the corresponding functions and effects.

In a case where the device is a second communication node, the preceding device may be configured to execute the transmission method applied to the second communication node in any one of the preceding embodiments and has corresponding functions and effects.

In a case where the device is a third communication node, the preceding device may be configured to execute the transmission method applied to the third communication node in any one of the preceding embodiments and has corresponding functions and effects.

In a case where the device is a fourth communication node, the preceding device may be configured to execute the transmission method applied to the fourth communication node in any one of the preceding embodiments and has corresponding functions and effects.

The embodiment of the present application further provides a storage medium including computer-executable instructions which, when executed by a computer processor, are configured to execute a transmission method applied to a first communication node. The method includes the following. Configuration information of a broadcast service or multicast service is received from a second communication node; and broadcast service or multicast service data is received according to the configuration information of the broadcast service or multicast service.

The embodiment of the present application further provides a storage medium including computer-executable instructions which, when executed by a computer processor, are configured to execute a transmission method applied to a second communication node. The method includes the following. Configuration information of a broadcast service or multicast service is sent to a first communication node.

The embodiment of the present application further provides a storage medium including computer-executable instructions which, when executed by a computer processor, are configured to execute a transmission method applied to a third communication node. The method includes the following. Configuration information of a first broadcast service or multicast service is generated; and a message carrying the configuration information of the first broadcast service or multicast service is sent to a fourth communication node.

The embodiment of the present application further provides a storage medium including computer-executable instructions which, when executed by a computer processor, are configured to execute a transmission method applied to a fourth communication node. The method includes the following. Configuration information of a first broadcast service or multicast service sent by a third communication node is received; and configuration information of a second broadcast service or multicast service is generated.

The term user equipment encompasses any suitable type of wireless user equipment, such as a mobile phone, a portable data processing apparatus, a portable web browser or an onboard mobile station.

Generally speaking, various embodiments of the present application may be implemented in hardware or special-purpose circuits, software, logic or any combination thereof. For example, some aspects may be implemented in hardware while other aspects may be implemented in firmware or software executable by a controller, a microprocessor or another calculation apparatus, though the present application is not limited thereto.

Embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for a local technical environment and may be implemented using any suitable data storage technology, such as, but not limited to, a read-only memory (ROM), a random-access memory (RAM), and an optical memory device and system (a digital video disc (DVD) or a compact disk (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A communication method, applied to a user equipment, comprising:

receiving configuration information of a broadcast service or multicast service of a current serving cell from a base station or a distributed unit (DU) of the base station; and receiving broadcast service data or multicast service data according to the configuration information of the broadcast service or multicast service of the current serving cell;

wherein the configuration information of the broadcast service or multicast service of the current serving cell comprises configuration information of a broadcast service or multicast service control channel of the current serving cell and bearer configuration information of the broadcast service or multicast service of the current serving cell;

wherein the configuration information of the broadcast service or multicast service control channel of the current serving cell comprises a bandwidth part (BWP) identifier of the broadcast service or multicast service control channel; and the bearer configuration information of the broadcast service or multicast service of the current serving cell comprises an air interface transmission mode indication of the broadcast service or multicast service, wherein the air interface transmission mode indication of the broadcast service or multicast service comprises: a unicast transmission indication or a multicast transmission indication.

2. The method according to claim 1, wherein the configuration information of the broadcast service or multicast service further comprises at least one of:

system information of the broadcast service or multicast service, or configuration information of a broadcast service or multicast service transmission channel.

3. The method according to claim 2, wherein the system information of the broadcast service or multicast service comprises at least one of:

a service area list supported on a current frequency, a service area list supported on an adjacent frequency, a downlink frequency of an adjacent carrier or identification information of the broadcast service or multicast service.

4. The method according to claim 2, wherein in a case where the configuration information of the broadcast service or multicast service comprises the system information of the broadcast service or multicast service, the receiving the configuration information of the broadcast service or multicast service from the base station or the DU of the base station comprises:

receiving the system information of the broadcast service or multicast service through a system message or a dedicated radio resource control (RRC) message.

5. The method according to claim 2, wherein the configuration information of the broadcast service or multicast service control channel further comprises at least one of:

identification information of the broadcast service or multicast service, a repetition period of the broadcast service or multicast service control channel, an offset of the broadcast service or multicast service control channel, a start slot of the broadcast service or multicast service control channel, a duration of the broadcast service or multicast service control channel, or a modification period of the broadcast service or multicast service control channel.

6. The method according to claim 2, wherein in a case where the configuration information of the broadcast service or multicast service comprises the configuration information of the broadcast service or multicast service control channel, the receiving the configuration information of the broadcast service or multicast service from the base station or the DU of the base station comprises:

receiving the configuration information of the broadcast service or multicast service control channel through a system message or a dedicated RRC message.

7. The method according to claim 2, wherein the configuration information of the broadcast service or multicast service transmission channel comprises at least one of:

identification information of the broadcast service or multicast service, radio air interface identification information of the broadcast service or multicast service, Service Area Identifier (SAI), information of the broadcast service or multicast service, a neighbor list or scheduling configuration information of the broadcast service or multicast service transmission channel.

8. The method according to claim 7, wherein the scheduling configuration information of the broadcast service or multicast service transmission channel comprises at least one of:

a persistent timer of the broadcast service or multicast service transmission channel, a timer related to discontinuous reception (DRX) of the broadcast service or multicast service transmission channel, a scheduling period of the broadcast service or multicast service transmission channel, a scheduling offset of the broadcast service or multicast service transmission channel or a bandwidth part identifier of the broadcast service or multicast service transmission channel.

9. The method according to claim 2, wherein in a case where the configuration information of the broadcast service or multicast service comprises the configuration information of the broadcast service or multicast service transmission channel, receiving the configuration information of the broadcast service or multicast service from the base station or the DU of the base station comprises:

receiving the configuration information of the broadcast service or multicast service transmission channel through a system message, an RRC message transmitted on the broadcast service or multicast service control channel or a dedicated RRC message.

10. The method according to claim 2, wherein the bearer configuration information of the broadcast service or multicast service further comprises at least one of:

identification information of the broadcast service or multicast service, radio air interface identification information of the broadcast service or multicast service, Service Area Identifier information of the broadcast service or multicast service, a neighbor list, or configuration information of an air interface radio bearer of the broadcast service or multicast service.

11. The method according to claim 10, wherein the configuration information of the air interface radio bearer of the broadcast service or multicast service comprises at least one of:

identification information of the air interface radio bearer of the broadcast service or multicast service, a sequence number length of a Packet Data Convergence Protocol (PDCP) layer, a maximum context identifier, a reordering timer, a sequence number length of a radio link control (RLC) layer or a reassembly timer.

12. The method according to claim 2, wherein in a case where the configuration information of the broadcast service or multicast service comprises the bearer configuration information of the broadcast service or multicast service, the receiving the configuration information of the broadcast service or multicast service from the base station or the DU of the base station comprises:

receiving the bearer configuration information of the broadcast service or multicast service through a system message, an RRC message transmitted on the broadcast service or multicast service control channel or a dedicated RRC message; or configuring the bearer configuration information of the broadcast service or multicast service by default.

13. A communication method, applied to a base station or a distributed unit (DU) of the base station, comprising:

sending configuration information of a broadcast service or multicast service of a current serving cell to a user equipment;

wherein the configuration information of the broadcast service or multicast service of the current serving cell comprises configuration information of a broadcast service or multicast service control channel of the current serving cell and bearer configuration information of the broadcast service or multicast service of the current serving cell;

wherein the configuration information of the broadcast service or multicast service control channel of the current serving cell comprises a bandwidth part (BWP) identifier of the broadcast service or multicast service control channel; and the bearer configuration information of the broadcast service or multicast service of the current serving cell comprises an air interface transmission mode indication of the broadcast service or multicast service, wherein the air interface transmission mode indication of the broadcast service or multicast service comprises: a unicast transmission indication or a multicast transmission indication.

14. The method according to claim 13, wherein the configuration information of the broadcast service or multicast service comprises further at least one of:

system information of the broadcast service or multicast service, or configuration information of a broadcast service or multicast service transmission channel.

15. A user equipment, comprising a memory and at least one processor; wherein the memory is configured to store at least one program; and the at least one program, when executed by the at least one processor, causes the at least one processor to implement the transmission method according to claim 1.

* * * * *